US012651002B2

(12) United States Patent
Payagond et al.

(10) Patent No.: US 12,651,002 B2
(45) Date of Patent: Jun. 9, 2026

(54) SYSTEMS AND METHODS OF DATA ANALYTICS BASED ON ZERO EXTRACT TRANSFORM LOAD

(71) Applicant: Samsung Electronics Co., Ltd., Suwon-si (KR)

(72) Inventors: Rajashekhar Hanumantappa Payagond, San Diego, CA (US); Sambhab Mohapatra, San Jose, CA (US); Sukesh Nagaraja, San Jose, CA (US); Pramod Peethambaran, San Jose, CA (US); Somnath Roy, San Ramon, CA (US); Mayank Saxena, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 20 days.

(21) Appl. No.: 18/932,610

(22) Filed: Oct. 30, 2024

(65) Prior Publication Data

US 2025/0139115 A1     May 1, 2025

Related U.S. Application Data

(60) Provisional application No. 63/546,740, filed on Oct. 31, 2023.

(51) Int. Cl.
*G06F 16/00* (2019.01)
*G06F 16/25* (2019.01)

(52) U.S. Cl.
CPC .................................. *G06F 16/254* (2019.01)

(58) Field of Classification Search
CPC .............................. G06F 16/254; G06F 16/25
See application file for complete search history.

(56) References Cited

U.S. PATENT DOCUMENTS

2004/0254948 A1* 12/2004 Yao ........................ G06F 16/254
2024/0254948 A1* 8/2024 Mueller ............. F02M 21/0254

* cited by examiner

*Primary Examiner* — Cheryl Lewis
(74) *Attorney, Agent, or Firm* — Renaissance IP Law Group LLP

(57) ABSTRACT

Provided are systems, methods, and apparatuses for data analytics based on zero extract transform load (ETL). In one or more examples, the systems, devices, and methods include generating a data request for at least a subset of data stored in a database; converting the data request to an object storage request; determining, based on parsing the object storage request, that the object storage request includes an extract transform load (ETL) request; creating an ETL command based on the object storage request; routing the ETL command to a storage device based on the storage device comprising at least one ETL function requested in the data request; and determining information from result data that is received from the storage device in response to routing the ETL command to the storage device.

20 Claims, 12 Drawing Sheets

600

Admin node
605

Management app
620

REST API
625

Host
615

Host app
660

REST Controller
665

Node services
670

Framework library
675 zETL Module
680

Storage
685

Host
610

Host app
630

REST Controller
635

Node services
640

Framework library
645 zETL Module
650

Storage
655

700

Receive an extract transform load (ETL) command
1105

Read the subset of data from the database of the
storage node
1110

Provide the subset of data to a storage device of the
storage node
1115

Process the subset of data at the storage device
1120

Compute result data based on the processing
1125

SYSTEMS AND METHODS OF DATA ANALYTICS BASED ON ZERO EXTRACT TRANSFORM LOAD

CROSS-REFERENCE TO RELATED APPLICATIONS

This application claims the benefit of U.S. Provisional Patent Application Ser. No. 63/546,740, filed Oct. 31, 2023, which is incorporated by reference herein for all purposes.

TECHNICAL FIELD

The disclosure relates generally to memory systems, and more particularly to systems and methods of data analytics based on zero extract transform load (ETL).

BACKGROUND

The present background section is intended to provide context only, and the disclosure of any concept in this section does not constitute an admission that said concept is prior art.

Data analytics is the process of using tools, techniques, and methodologies to analyze raw data to extract insights and make decisions. Data analytics includes a multidisciplinary field that uses a variety of tools and techniques, including math, statistics, and computer science, to analyze data. Data analytics can be used to improve decision-making, streamline operations, and increase revenue. Data analytics can be used to enhance processes, optimize products and services, improve productivity, identify and leverage sources for a competitive advantage, and mitigate risk. Data analytics can be used in a variety of business uses, including marketing, employee metrics, inventory metrics, delivery logistics, etc. Data analytics can include gathering, cleaning, and studying data sets to solve problems.

SUMMARY

In various embodiments, the systems and methods described herein include systems, methods, and apparatuses for data analytics based on zero extract transform load (ETL). In some aspects, the techniques described herein relate to a method of data analysis including: generating a data request for at least a subset of data stored in a database; converting the data request to an object storage request; determining, based on parsing the object storage request, that the object storage request includes an extract transform load (ETL) request; creating an ETL command based on the object storage request; routing the ETL command to a storage device based on the storage device including at least one ETL function requested in the data request; and determining information from result data that is received from the storage device in response to routing the ETL command to the storage device.

In some aspects, the techniques described herein relate to a method, wherein the result data is generated based on the subset of data being transformed at the storage device according to the ETL function.

In some aspects, the techniques described herein relate to a method, wherein the ETL command is configured as a representational state transfer (REST) command based on determining the object storage request includes the ETL request.

In some aspects, the techniques described herein relate to a method, wherein the ETL command includes a name of a storage node including the storage device.

In some aspects, the techniques described herein relate to a method, further including: determining the data request is part of a batch data request; and combining the data request with at least a second request based on the data request and the second request being associated with a same host server.

In some aspects, the techniques described herein relate to a method, further including: determining a second storage device is associated with a processing load imbalance; and distributing at least one of an ETL function of the second storage device or a second ETL command assigned to the second storage device from the second storage device to the storage device based on the processing load imbalance.

In some aspects, the techniques described herein relate to a method, wherein the storage device includes at least one of a storage server or a computational storage drive including one or more processors configured to execute the transform function.

In some aspects, the techniques described herein relate to a method, wherein the data request includes at least one of: a key value (KV) fetch and the database includes a KV database, or a filter criterion for narrowing down data in the database to the subset of data.

In some aspects, the techniques described herein relate to a method, wherein the data request specifies an identifier for the data request.

In some aspects, the techniques described herein relate to a method, wherein the object storage request includes an ETL identifier.

In some aspects, the techniques described herein relate to a method of data analysis including: receiving an extract transform load (ETL) command at a storage node, the ETL command including a data request for a subset of data stored in a database; reading the subset of data from the database of the storage node; providing the subset of data to a storage device of the storage node for processing of the subset of data at the storage device; processing the subset of data at the storage device based on the storage device including at least one ETL function requested in the data request; and computing result data based on the processing.

In some aspects, the techniques described herein relate to a method, further including providing the result data to at least one of a client device that provided a representational state transfer (REST) command associated with the ETL command, to an application of the client device, to the storage device to store the result data, to a different storage device, or to a function requesting the result data.

In some aspects, the techniques described herein relate to a method, further including transferring the result data to a client device that provided the ETL command based on the ETL command including remote direct memory access (RDMA) data direct information that indicates the client device includes an RDMA capable network interface card.

In some aspects, the techniques described herein relate to a method, further including identifying a second data request based on the ETL command being configured as a batch command, the ETL command including the second data request for a second subset of data stored in the database.

In some aspects, the techniques described herein relate to a method, further including processing the second subset of data at a second storage device based on the second storage device including at least a second ETL function requested in the second data request.

In some aspects, the techniques described herein relate to a method, wherein the storage device includes at least one of a storage server or a computational storage drive including one or more processors for processing the subset of data at the storage device.

In some aspects, the techniques described herein relate to a method, wherein the data request includes a key value (KV) fetch and the database includes a KV database.

In some aspects, the techniques described herein relate to a non-transitory computer-readable medium storing code that includes instructions executable by a processor to: generate a data request for at least a subset of data stored in a database; convert the data request to an object storage request; determine, based on parsing the object storage request, that the object storage request includes an extract transform load (ETL) request; create an ETL command based on the object storage request; route the ETL command to a storage device based on the storage device including at least one ETL function requested in the data request; and determine information from result data that is received from the storage device in response to routing the ETL command to the storage device.

In some aspects, the techniques described herein relate to a non-transitory computer-readable medium, wherein the result data is generated based on the subset of data being transformed at the storage device according to the ETL function.

In some aspects, the techniques described herein relate to a non-transitory computer-readable medium, wherein the ETL command is configured as a representational state transfer (REST) command based on determining the object storage request includes the ETL request.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods described herein include multiple advantages and benefits. For example, the systems and methods provide distributed cluster level offloading. The systems and methods incorporate inter-node communications, data distribution, and aggregation for ETL functions into a given framework. Based on the systems and methods described, including ETL function offloading to storage servers, there is no or minimal data transfer, which results in increase in performance and reduction in total cost of ownership as overall resource requirements are reduced. Some solutions require an entire object to be read into the compute node before processing. The disclosed zero ETL (zETL) systems and methods avoid reading entire objects to a compute node by running on chunked data and processing near where the data is stored and storing the results in the requested format, all of which avoids extra data copying. The systems and methods of zETL disclosed herein may be extended to offload transform functions or any compute in the ETL pipeline to storage devices capable of compute (e.g., computational storage drives, Smart-SSDs, CXL-HC devices, etc.). The systems and methods may be configured for handling ETL through data formatting, distributing processing to ensure the parallel offloading, and may handle several data formats for storing results. Based on the systems and methods, compute resources may scale automatically. As more storage is added, the capacity to offload may increase, thus increasing overall compute capacity. The systems and methods disclosed herein may provide higher performance with higher parallelism of ETL functions. As the data is distributed across a storage cluster, the offloading can happen in parallel, accelerating the ETL pipeline. Some disclosed solutions transfer the entire data to a compute node and perform the functions, whereas the systems and methods run the functions in storage (e.g., computational storage drives, storage servers) without the need for data transfer. The systems and methods enable applications to use the zETL framework described herein without any changes in the pipeline code, as zETL adapters may handle the zETL specific API communication. Some ETL solutions may require specific APIs to be used to write pipelines without any user control on where data is processed. The systems and methods enable a hybrid model for ETL with at least some functions offloaded to the storage servers, at least some functions offloaded to compute capable storage devices, and/or at least some compute running on client servers, providing a flexible, customizable solution.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
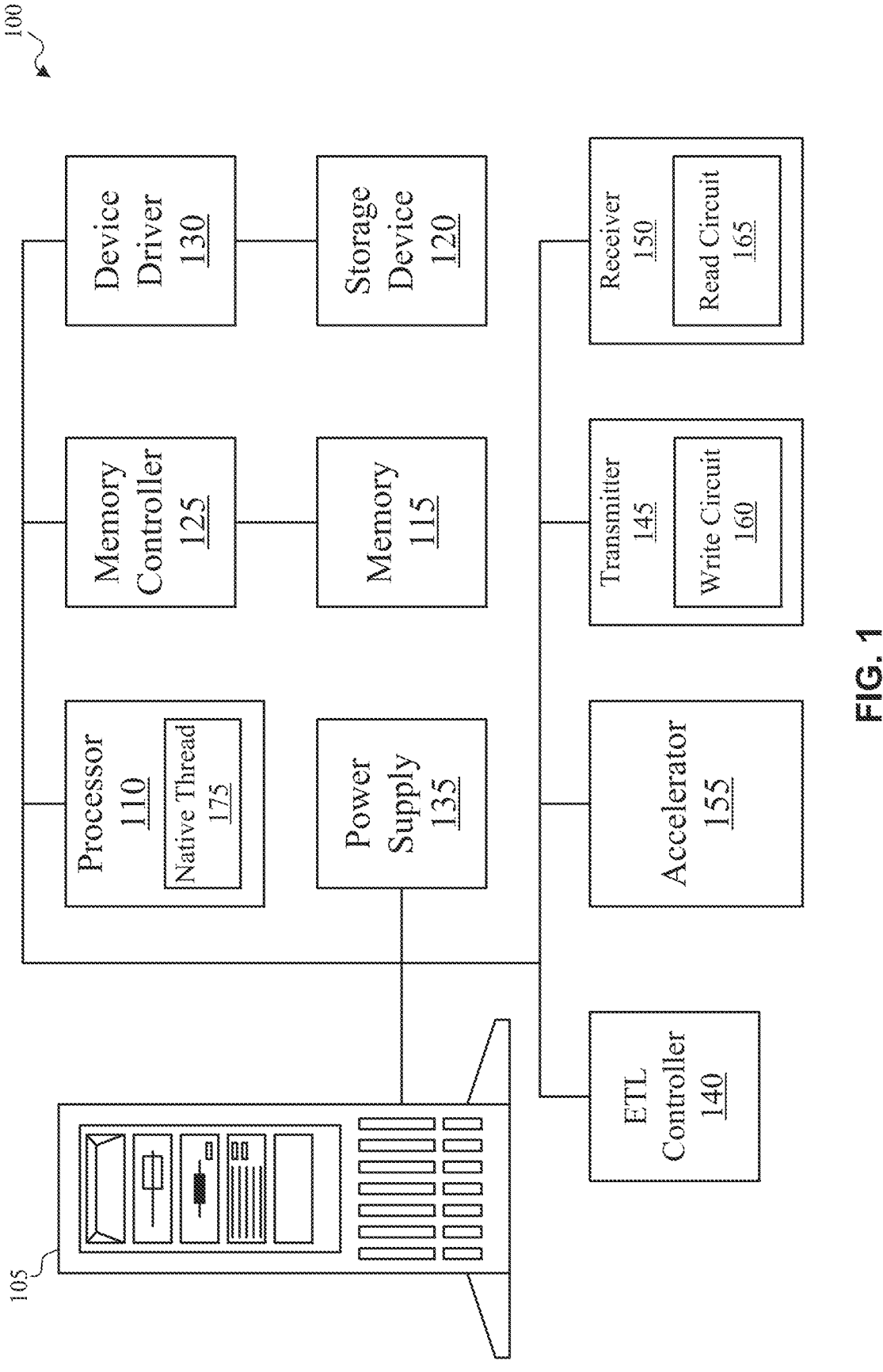
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The systems and methods described may be based on and/or include Extract Transform Load (ETL) processes. ETL can include a process that moves data from a source system to a destination system, typically a data warehouse. The process can involve extracting data from the source system, transforming it so it's better suited for analytics, and loading it into the target system. Triggers for ETL can include scheduled triggers (e.g., automatically execute an ETL pipeline at a specific time each day); event triggers (e.g., monitor a data source for new data arrival and trigger an ETL pipeline); data-driven triggers (e.g., trigger an ETL pipeline when data arrives in different partitions or folders based on certain criteria); manual triggers (e.g., initiate an ETL pipeline manually for ad-hoc data processing tasks); lambda functions (e.g., subscribe to an Simple Queue Service (SQS) queue to kick off an ETL pipeline when a new file is processed); and/or glue triggers (e.g., start an ETL job or crawler manually or automatically). ETL can provide a consolidated view of data for in-depth analysis and reporting. Managing multiple datasets demands time and coordination and can result in inefficiencies and delays. ETL can combine databases and various forms of data into a single, cohesive view. The systems and methods described may include performing ETL operations. However, instead of performing ETL operations separate from storage, the ETL operations described herein may be performed on a storage device (e.g., where ETL data may be stored).

In ETL, the transform step can prepare data for analysis by converting the structure or format of data to match a target system. Transform functions can include cleaning (e.g., removing duplicates, filling in missing values); reshaping (e.g., converting currencies, pivot tables) computing (e.g., calculating new dimensions and metrics); filtering (e.g., selecting a subset of data based on criteria); sorting (e.g., ordering data); joining (e.g., combining data); aggregating (e.g., combining data); splitting (e.g., dividing data); validating (e.g., ensuring data quality); authenticating (e.g., ensuring data quality); auditing (e.g., ensuring data quality and compliance); masking, hashing, or removing (e.g., protecting data governed by regulation); formatting (e.g., matching the schema of the target data warehouse), etc. The transform step in ETL can improve data integrity, standardize the data, and prepare it for effective analysis and decision-making. Thus, ETL can help companies gain insights into their operations, processes, customers, etc.

ETL may be implemented in a number of ways. For example, a financial institution might have information on a customer in several departments and each department might have that customer's information listed in a different way. The membership department might list the customer by name, whereas the accounting department might list the customer by number. ETL can bundle all of these data elements and consolidate them into a uniform presentation, such as for storing in a database or data warehouse. Another way that companies may use ETL is to move information to another application. For instance, the new application might use another database vendor and a different database schema. ETL can be used to transform the data into a format suitable for the new application to use. Another example may include an expense and cost recovery system such as used by accountants, consultants, etc. The data may end up in the time and billing system, although some businesses may utilize the raw data for employee productivity reports to Human Resources and/or equipment usage reports to Facilities Management.

The systems and methods described may be based on and/or include block storage, object storage, file storage, etc. With block storage, a block is a chunk of data, and the chunks can be combined to create a file. A block has an address, and the application retrieves a block by making a call to that address. Like file storage, object storage is for unstructured data, while block storage may be used for structured data, such as information inside databases. Object storage may store a file as objects by dividing a file into multiple objects (e.g., objects of some set size) and storing the objects. Unlike files and file systems, objects may be stored in a flat structure. Each object includes the data, metadata, and a unique identifier that applications can use for easy access and retrieval. There are no folders or directions in object storage, making it easy to retrieve data, as the exact location is not required. From a pool of objects, a given object may be retrieved by presenting its object ID. Objects may be local or geographically dispersed, but because they are in a flat address space, they are retrieved the same way (e.g., object ID). The systems and methods described may include saving data in chunks (e.g., 1 MB chunks).

The systems and methods described may be based on and/or include a key value (KV) database, or KV store. A KV database can include a data storage paradigm for storing KV pairs for use in high performance reads and writes at the edge. A KV database may be designed for storing, retrieving, and managing associative arrays. A KV database may use a hash table to store unique keys and their corresponding data values. A KV pair may include a data structure that associates a key with a value. A key may include a constant that defines the data set (e.g., species, color), and a value may include a variable that belongs to the data set (e.g., human, green). Thus, a KV pair could include "species=human" or "color=green." A KV request can include a request made to a KV database for data (e.g., KV pair) stored in the KV database. The systems and methods described may include retrieving data that includes one or more KV pairs.

Requesting data from a database (e.g., KV database) may be based on one or more filters. Filtering data from a database can include criteria for narrowing down a large dataset to only show the most relevant information (e.g., a subset of data). Filters can be used to display specific records in a form, report, query, or datasheet. Filters can be used to provide only certain records from a table, query, or report.

The systems and methods described may be based on and/or include application programming interfaces (APIs). An API may include a set of rules that allows software applications to communicate and exchange data. APIs may be used in a number of applications, including mobile apps, web apps, cloud services, etc. The systems and methods described may be based on and/or include JavaScript Object Notation (JSON). JSON can include a text-based format for storing and exchanging data that's both human-readable and machine-parsable. JSON files may include keys as names and values containing related data. Data may be separated by commas, curly braces may hold objects, and square brackets may hold arrays. The systems and methods described may include performing ETL operations based on one or more APIs.

The systems and methods described may be based on and/or include a Representational State Transfer (REST) command. A REST command can include a request made to a server to retrieve or modify data. REST can be based on a software architectural style that uses Hypertext Transfer Protocol (HTTP) to deliver APIs. REST commands may run by calling a method on a REST resource and passing parameters or a request in JSON format. A REST command can include an HTTP verb that defines the operation to perform; a header that allows the client to pass information about the request; a path to a resource (e.g., location of the resource); and/or a message body that includes data. REST commands may return a response in a dictionary that contains status and content. The status may include the HTTP response code, and the content may include the response body as JSON or text. A REST command can include a method that calls a REST resource and passes a request or parameters in JSON format. The systems and methods described may include performing ETL operations based on one or more REST commands (e.g., an ETL command converted into a REST command).

The systems and methods described may be based on and/or include Simple Storage Service (S3). S3 storage may include a cloud-based object storage service that allows users to store, access, and manage data. An S3 request (e.g., object storage request, S3 get request) may include a request made to S3 storage to create, retrieve, update, or delete objects. The systems and methods described may include performing ETL operations based on an S3 protocol (e.g., interfacing storage based on S3).

The systems and methods described may be based on and/or include MinIO. MinIO may include a high-performance distributed object storage system that can be used for data storage, backup and recovery, and cloud-based applications. MinIO may include a software-defined, open-source object storage system that runs on industry standard hardware. MinIO may be used for private and hybrid cloud object storage, and can run on any cloud or on-premises infrastructure. MinIO is compatible with APIs, enabling MinIO to be integrated with S3-based applications. MinIO provides robust data protection for AI storage datasets through a number of different features, including erasure coding and site replication, ensuring data redundancy and fault tolerance to safeguard against hardware failures or data corruption. The systems and methods described may include performing ETL operations based on MinIO (e.g., performing ETL operations relative to object storage systems based on MinIO).

The systems and methods described may be based on and/or include Disaggregated Storage Solution (DSS). DSS can include a rack-scalable, high read-bandwidth-optimized, S3-compatible object storage solution. It utilizes a disaggregated architecture, enabling independent scaling of storage and compute. It features an end-to-end KV semantic communication stack, entirely eliminating the legacy software storage stack. The systems and methods described may include performing ETL operations based on DSS (e.g., interacting with object storage systems based on DSS).

The systems and methods described may be based on and/or include non-volatile memory express (NVMe®), NVMe over Fabrics (NVMe-oF), and/or Remote Direct Memory Access (RDMA). Storage communication may use the NVMeOF-KV-RDMA protocol. With zero-copy transfer, NVMeOF-KV-RDMA achieves high end-to-end performance. The DSS client-side stack may include a high-performance wrapper library for simpler application integration. Applications utilizing the DSS client library may eliminate the need for bucket semantics, key distribution, and load balancing between server-side S3 endpoints. The systems and methods described may include performing ETL operations based on NVMe-oF (e.g., providing ETL computation results based on NVMe-oF).

The systems and methods described may be based on and/or include a web-based business intelligence (BI) tool (e.g., COGNOS®), which may be configured to enable data exploration (explore and prepare data); data visualization (e.g., create interactive dashboards and enterprise reports); predictive analytics (e.g., perform predictive forecasting and decision trees); AI assistance (e.g., machine learning insights); data sharing (e.g., share data over different platforms or in the cloud); storytelling (e.g., combine charts to create a story based on data analysis); and/or enable users to analyze data, create reports, and make informed decisions, including data preparation (e.g., upload, connect to, join, model data).

The systems and methods described may be based on and/or include an SVK plugin and/or a Cognos plugin. Cognos plugins and/or SVK plugins may include a set of computing resources and task types that can extend the functionality of a storage device (e.g. storage server, computational storage drive configured for offloading execution of ETL functions). Plug-ins can be used to target specific systems or technologies. For example, a Cognos/SVK plug-in can be used to execute one or more ETL functions on a storage device; move or delete a file on a remote server; fetch a file from a remote server and make a local copy; return a directory listing of a specific path on a remote server. The systems and methods described may include performing ETL operations based on Cognos (e.g., executing ETL operations on a storage device based at least in part on Cognos and/or Cognos SVK plug-ins).

In some systems, data (e.g., structured data, unstructured data, and/or flat data) is transferred, via a network (e.g., fabric) to a compute resource (e.g., host CPU, GPU, NPU, etc.). The compute resource may process the data (e.g., transform raw data for analysis by cleaning data, reshaping data, reformatting data, improving data integrity, and/or computing new dimensions and metrics from the data). The transformed data may then be written back to storage and made available for queries regarding the transformed data.

Large sets of data may be moved from various data sources (e.g., storage servers, storage clusters) over a fabric (e.g., data network) to the transform functions (e.g., compute resources, CPUs, GPUs, accelerators). This data movement reduces performance (e.g., increased latency and decreased throughput) of the transform stages of ETL, and increases the total cost of ownership (TCO) for a given system.

Based on the systems and methods of zero ETL described herein, data is retrieved in the storage device (e.g., storage server, storage drive, storage cluster, computational storage), transformed in the storage device via one or more processors on the storage device, and stored in the storage device to make the transformed data available to a client device, an application, another function, another database, etc. (e.g., based on a query or request from client, from application, etc.). Accordingly, the systems and methods avoid or minimize ETL steps, especially large data-transfer steps, in large applications, like data analytics, by dynamically offloading transform algorithms and performing the compute near storage. The systems and methods reduce the data transfer size and reduce the system resource requirements, thereby improving the overall system performance while lowering the cost of ownership. With zero ETL, data may be accessed in real-time or near real-time, further improving ETL processing efficiency.

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for ease of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may include one or more computational storage devices (e.g., storage devices with compute resources, processing units, etc.). Storage device 120 may support any desired protocol or protocols, including, for example, the Non-Volatile Memory Express (NVMe®) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe®) interface, or a Compute Express Link (CXL®) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include accelerator 155, which may be used to perform one or more operations described herein.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (Open-CAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, extract transform load (ETL) controller 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of ETL controller 140 may be implemented as an SoC.

In some examples, ETL controller 140 may include any one or combination of logic (e.g., logical circuit), hardware (e.g., processing unit, memory, storage), software, firmware, and the like. In some cases, ETL controller 140 may perform one or more functions in conjunction with processor 110. In some cases, at least a portion of ETL controller 140 may be implemented in or by processor 110 and/or memory 115. The one or more logic circuits of ETL controller 140 may include any one or combination of multiplexers, registers, logic gates, arithmetic logic units (ALUs), cache, computer memory, microprocessors, processing units (processor 110, accelerator 155, CPUs, GPUs, NPUs, and/or TPUs), FPGAs, ASICs, etc., that enable ETL controller 140 to provide systems and methods of data analytics based on zero extract transform load (ETL).

In one or more examples, ETL controller 140 may provide distributed cluster level offloading for ETL processing. ETL controller 140 avoids or minimizes data transfer, which results in increase in performance and reduction in total cost of ownership as overall resource requirement is reduced. ETL controller 140 may offload transform functions or any compute in the ETL pipeline to storage devices capable of compute (e.g., computational storage drives, Smart-SSDs, CXL-HC devices, etc.). ETL controller 140 runs ETL functions in storage (e.g., computational storage drives, storage servers) avoiding or reducing the need for ETL data transfer. ETL controller 140 enables a hybrid model for ETL where functions may be offloaded to storage servers, to compute capable storage devices, and/or on client servers, providing a flexible, customizable solution.

Figure 2:
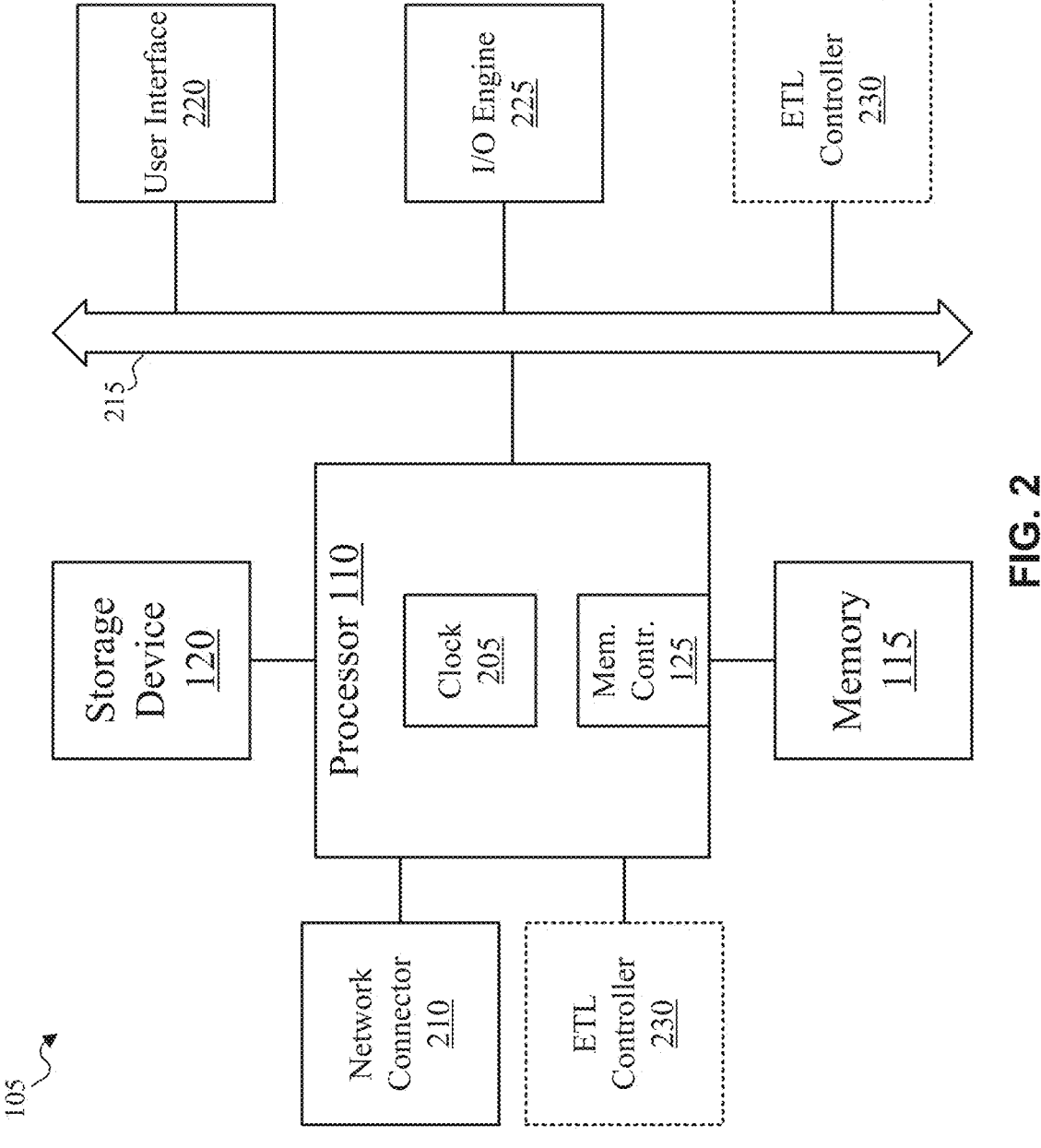
FIG. 2 illustrates details of the system of FIG. 1, according to one or more implementations as described herein.

FIG. 2 illustrates details of machine 105 of FIG. 1, according to examples described herein. In the illustrated example, machine 105 may include processor 110. Processor 110 may include one or more processors and/or one or more dies. Processor 110 may include memory controller 125 (e.g., one or more memory controllers) and clock 205 (e.g. one or more clocks), which may be used to coordinate the operations of the components of the machine. Processor 110 may be coupled to memory 115 (e.g., one or more memory chips, stacked memory, etc.), which may include random access memory (RAM), read-only memory (ROM), or other state preserving media, as examples. Processor 110 may be coupled to storage device 120 (e.g., one or more storage devices), and to network connector 210, which may be, for example, an Ethernet connector or a wireless connector. Processor 110 may be connected to bus 215 (e.g., one or more buses), to which may be attached user interface 220 (e.g., one or more user interfaces) and Input/Output (I/O) interface ports that may be managed using I/O engine 225 (e.g., one or more I/O engines), among other components. As shown, processor 110 may be coupled to ETL controller 230, which may be an example of ETL controller 140 of FIG. 1. Additionally, or alternatively, processor 110 may be connected to bus 215, to which may be attached ETL controller 230. In some cases, one or more zETL operations described herein may be executed by and/or in conjunction with processor 110.

Figure 3:
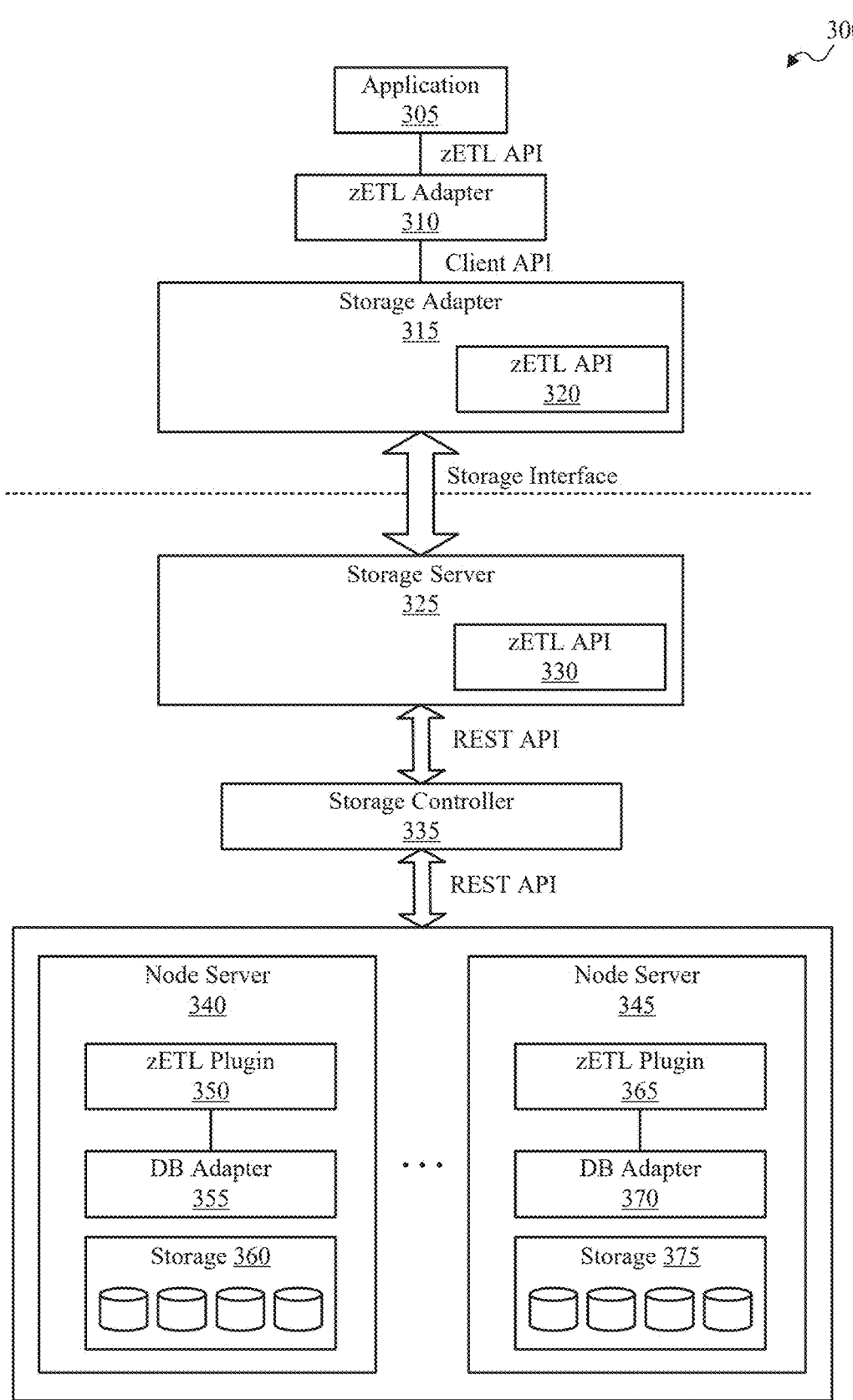
FIG. 3 illustrates an example system in accordance with one or more implementations as described herein.

FIG. 3 illustrates an example system 300 in accordance with one or more implementations as described herein. In some configurations, one or more aspects of system 300 may be implemented by or in conjunction with ETL controller 140 of FIG. 1 and/or ETL controller 230 of FIG. 2. In some configurations, one or more aspects of system 300 may be implemented by or in conjunction with machine 105, components of machine 105, or any combination thereof.

As shown, system 300 may include application 305, zero ETL (zETL) adapter 310, storage adapter 315, which may include zETL API 320 (e.g., one or more zETL APIs). In some cases, storage adapter 315 may include or represent a disaggregated storage solution (DSS) client (e.g., client of application 305). In some cases, application 305 may include at least one user application. In some cases, application 305 may include an application of a host (e.g., machine 105). In some cases, zETL adapter 310 may include an SSD Value Kit (SVK) zETL adapter. In some cases, an SVK device (e.g., SVK zETL adapter, SVK controller) may be part of an SVK framework that enables offloading ETL compute functions to storage devices. The SVK framework may include hardware, firmware, and/or software (e.g., APIs) that enable offloading ETL compute functions to storage devices. In some cases, application 305 may interface with zETL adapter 310 via an API (e.g., zETL API). In some cases, zETL adapter 310 may interface with storage adapter 315 via a client API.

As shown, storage adapter 315 may interface with storage server 325, which may include zETL API 330 (e.g., one or more zETL APIs). In some cases, the interface between storage adapter 315 and storage server 325 may include an object storage server interface (e.g., Simple Storage Service (S3) storage interface). In the illustrated example, system 300 may include storage server 325, and storage controller 335. In some cases, storage controller 335 may include an SVK controller. An SVK controller (e.g., storage controller 335) may control one or more aspects of an SVK framework (e.g., control data requests, control application of APIs, control aspects of zETL processing, etc.). Thus, storage controller 335 may control one or more aspects of offloading ETL processing to storage devices.

In the illustrated example, storage server 325 may interface with storage controller 335 based on one or more APIs. For example, storage server 325 may interface with storage controller 335 based on a Representational State Transfer (REST) API. REST APIs can include a type of API that allows two computer systems to exchange information over a network (e.g., over Internet, cloud networking).

As shown, system 300 may include one or more node servers (e.g., a storage cluster that includes node server 340 and node server 345). As shown, node server 340 may include zETL plugin 350, database (DB) adapter 355, and storage 360. Node server 345 may include zETL plugin 365, DB adapter 370, and storage 375. Storage 360 and/or storage 375 may include one or more storage mediums (e.g., disk, NAND flash, non-volatile memory, volatile memory, etc.). As shown, storage controller 335 may interface with node server 340 and/or node server 345 based on a REST API. In some cases, the REST API between storage controller 335 and storage cluster of node server 340 and node server 345 may be based on Remote Procedure Call (RPC), such as Google Remote Procedure Call (gRPC), which can include an open-source, cross-platform high-performance remote procedure call framework for implementing APIs that uses HTTP/2 to connect services and devices. In some cases, the offloading of ETL functions to storage devices may be based on the REST API and/or gRPC. In some cases, zETL plugin 350 and/or zETL plugin 365 may include an SVK plugin (e.g., SVK zETL feature plugin) and/or a Cognos-based zETL feature plugin. In some cases, DB adapter 355 may include a DSS NKV library.

In some examples, application developers may identify and build ETL functions (e.g., ETL transform functions, ETL APIs, ETL feature plugins, etc.). In some cases, a set of ETL functions may be linked (e.g., chained functions, linked functions). In some cases, the ETL functions may be combined within a directed acyclic graph (DAG). For example, multiple ETL functions may be defined within the same DAG, setting dependencies between them using a bitwise shift operator ($>>$) to specify the order of execution, chaining the functions together to create a logical workflow where the output of one task becomes the input for the next. In some cases, zETL adapter 310 (e.g., Cognos zETL adapter) may use zETL APIs (e.g., Cognos zETL APIs) to offload these functions from a host or client node to a storage node or storage device (e.g., data server node, storage server, computational storage drive). In some cases, storage server 325 may manage the routing and distribution of ETL functions. In some cases, zETL plugin 350 and/or zETL plugin 365 may facilitate execution of one or more zETL functions in or near storage. In some cases, ETL functions may be performed in parallel on two or more storage nodes (e.g., all storage nodes) where the data being processed is distributed. For example, one or more ETL functions may be executed on a storage device (e.g., SSDs, smart SSDs, computational storage devices, storage drives with one or more processing units). In some cases, the ETL functions may be executed on a storage device where the ETL data is stored (e.g., where the data being extracted, transformed, and/or loaded in an ETL operation is stored). In some cases, DB adapter 355 and/or DB adapter 370 may format the results of ETL functions in a requested data format and provide the formatted data to a requested location (e.g., on the same storage, load to an application, load to another ETL function, load to a next ETL function in a sequence of chained ETL functions, etc.).

In some examples, a storage server node (e.g., node server 340, node server 345) may include a number of storage drives (e.g., 16 SSDs, 16 smart SSDs, 16 computational storage drives), enabling a given cluster to run a number of parallel offloaded ETL functions (e.g., 16 parallel offloaded ETL functions). For example, the ETL functions may be executed on the one or more storage drives. ETL functions may run calculations for different ranges of data in an ETL pipeline, and the results of the multiple calculations may be written back into storage. For example, a first storage drive may compute calculations for a first range of data in the ETL pipeline, a second storage drive may compute calculations for a second range of data in the ETL pipeline, and so on. The results (e.g., results from one or more storage drives) may be returned back to the application (e.g., application 305), may be queried later, and/or may be used in further calculations of the ETL pipeline and/or in other ETL pipelines. As the data is local and not moved around, the response times of ETL processing are improved significantly. The data may be preprocessed and stored in storage devices, and an object server (e.g., storage server 325) may manage the layout and locality of the data.

The zETL architecture of system 300 provides per device offload of ETL algorithms, which increases the number of parallel operations and improves overall system performance. Configuring the data to be closer to the processing (e.g., on storage processing) and avoiding data transfer over a system network improves overall system performance and reduces system costs.

In some cases, an SVK zETL solutions stack may be divided into two components, namely a zETL adapter (e.g., zETL adapter 310) and a zETL plugin (e.g., zETL plugin 350, zETL plugin 365). The zETL adapter may include a user interface and the zETL plugin may be configured as the main working element in the SVK framework handling and/or performing the offloading of ETL functionality.

System 300 may implement an SVK Zero ETL architecture that includes several components and that can be viewed as comprising several layers. The user application (e.g., application 305), SVK-zETL adapter (e.g., zETL adapter 310), and storage adapter (e.g., storage adapter 315) may be three components of the SVK Zero ETL architecture that includes hardware executing applications running in a client physical machine. This layer may interact with the storage server layer through S3 APIs. The storage server layer may include a storage server (e.g., storage server 325) and SVK controller (e.g., storage controller 335). The storage server may communicate with the SVK controller to perform one or more ETL offloading operations. The SVK controller may communicate with a storage cluster that may include one or more SVK storage node servers (e.g., node server 340, node server 345). The SVK Zero-ETL plugin (e.g., zETL plugin 350, zETL plugin 365) may run in these storage node servers, where the execution of the offloaded ETL functions occurs.

Figure 4:
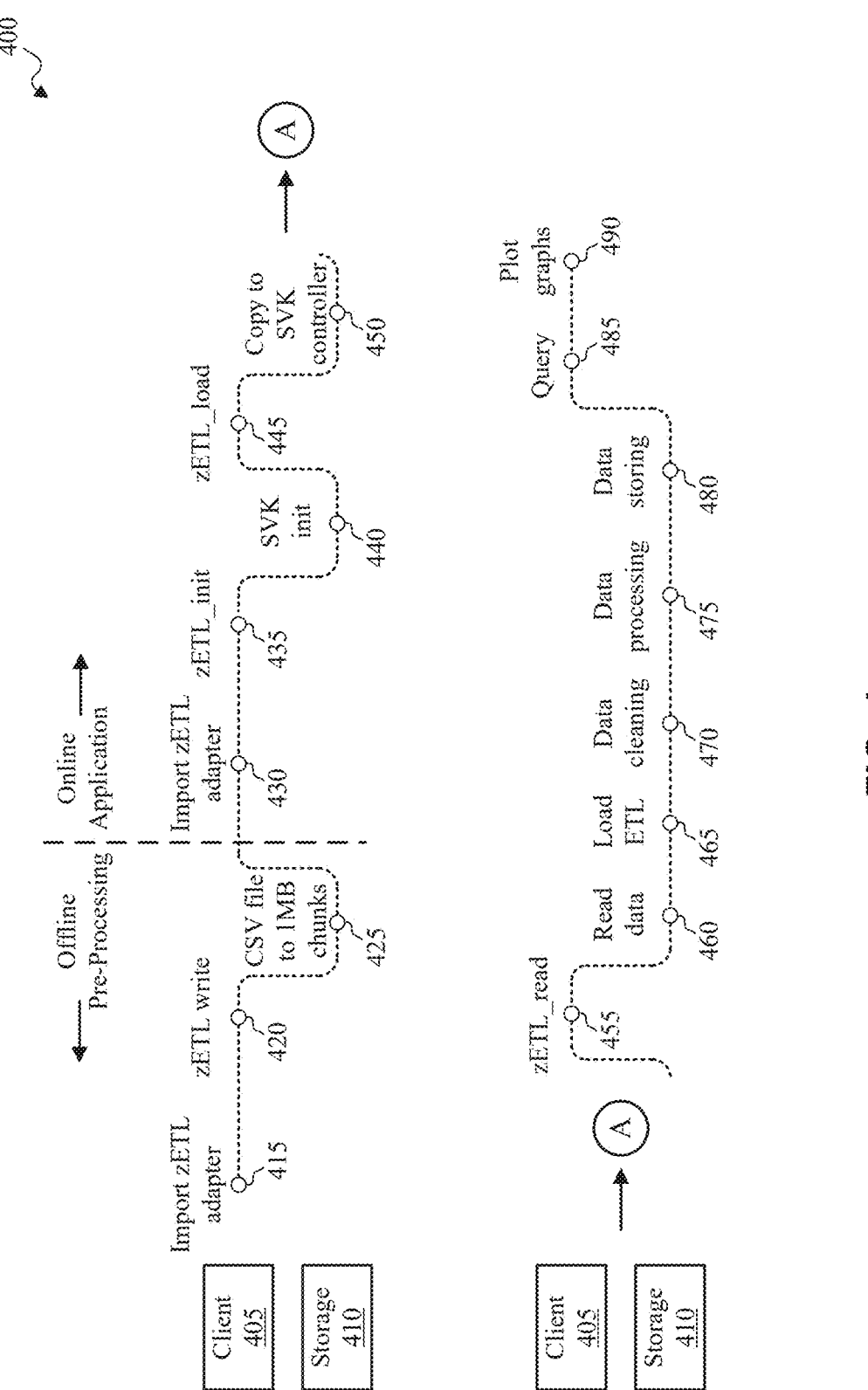
FIG. 4 illustrates an example system flow in accordance with one or more implementations as described herein.

FIG. 4 illustrates an example system flow 400 in accordance with one or more implementations as described herein. In some configurations, one or more aspects of system flow 400 may be implemented by or in conjunction with ETL controller 140 of FIG. 1 and/or ETL controller 230 of FIG. 2. In some configurations, one or more aspects of system flow 400 may be implemented by or in conjunction with machine 105, components of machine 105, or any combination thereof.

In the illustrated example, system flow 400 may include client 405 and storage 410. As shown, system flow 400 may include operations associated with client 405 and storage 410. In some cases, client 405 may include an application (e.g., application 305), one or more zETL adapters (e.g., zETL adapter 310), and/or a storage adapter (e.g., storage adapter 315). In some examples, client 405 and/or storage 410 may include one or more zETL APIs (e.g., zETL API 320, zETL API 330). In some cases, storage 410 may include one or more storage devices (e.g., storage server, computational storage drive). Storage 410 may include one or more processors (e.g., configured to execute ETL transform functions).

At 415, client 405 may import one or more zETL adapters. A zETL adapter (e.g., zETL adapter 310) may include hardware, firmware, and/or software configured to perform one or more operations described herein. In some cases, a zETL adapter may enable client 405 to offload one or more ETL functions to a storage device (e.g., storage 410).

At 420, client 405 may perform a zETL write. In some cases, the zETL write may distribute the data (e.g., data being processed) in a storage cluster (e.g., storage 410).

At 425, storage 410 may store the data (e.g., based on the zETL write) in data chunks (e.g., 1 MB data chunks). In some cases, the data chunks may include comma separated value (CSV) files (e.g., 1 MB CSV files).

As shown, one or more operations of system flow 400 (e.g., 415, 420, and/or 420) may be part of a pre-processing (e.g., offline pre-processing). In some cases, one or more operations of system flow 400 (e.g., at least one operation from 430 to 490) may be part of online processing (e.g., online application).

At 430, client 405 may import one or more zETL adapters (e.g., zETL adapter 310), which may include hardware, firmware, and/or software configured to perform one or more operations described herein. In some cases, a zETL adapter may enable client 405 to offload one or more ETL functions to a storage device (e.g., storage 410).

At 435, client 405 may initiate zETL and/or perform a zETL initialization operation. For example, client 405 may initiate offloading execution of an ETL function to storage 410.

At 440, storage 410 may initiate one or more aspects of offloading execution of an ETL function to storage 410. For example, storage 410 may initiate one or more aspects of an SSD Value Kit (SVK), which may be associated with a storage cluster (e.g., a storage cluster of storage 410).

At 445, client 405 may perform one or more aspects of zETL that includes offloading execution of an ETL function to storage 410. In some cases, client 405 may load data associated with zETL offloading. In some cases, client 405 may load or call one or more APIs associated with zETL offloading. In some cases, client 405 may load or generate one or more ETL commands associated with zETL offloading.

At 450, storage 410 may perform a copy operation in relation to a storage controller (e.g., SVK controller) associated with offloading execution of an ETL function to storage 410. In some cases, storage 410 may copy data to a storage controller. In some cases, storage 410 may copy data to a storage controller of storage 410. In some cases, storage 410 may copy data to a storage controller of storage 410. In some cases, storage 410 may copy one or more zETL commands to a storage controller of storage 410. In some examples, storage 410 may copy an ETL .SO file (e.g., etl.so, a dynamically linked ETL shared object library, a shared ETL object, shared ETL library, or shared ETL object library). In some examples, storage 410 may copy an ETL .JSON file (e.g., etl.json, a JavaScript Object Notation (JSON) file for offloading execution of an ETL function to storage 410). In some cases, storage 410 may copy the .SO file and/or .JSON ETL files via client 405 (e.g., a disaggregated storage solution (DSS) client).

At 455, client 405 may perform a read operation for offloading execution of an ETL function to storage 410. In some cases, client 405 may read files and/or commands associated with an ETL offloading operation.

At 460, storage 410 may read data associated with execution of an ETL function to storage 410 (e.g., read data stored on storage 410). In some cases, storage 410 may read or receive an ETL command, ETL API associated with execution of an ETL function to storage 410. Execution of an ETL function offloaded to storage 410 may include at least operations 460, 465, 470, 475, and/or 480 from system flow 400.

At 465, storage 410 may perform one or more load operations (e.g., load one or more ETL functions, load ETL functions executed concurrently or in parallel). In some cases, storage 410 may load an ETL.SO file (e.g., as an SVK plugin). For instance, storage 410 may load an ETL.SO file as an SVK plugin on an SVK server of storage 410 (e.g., storage cluster server of storage 410).

At 470, storage 410 may perform one or more data cleaning operations (e.g., executing data cleaning operations for multiple ETL functions concurrently or in parallel). For example. storage 410 may receive an ETL command, read data stored at storage 410 (e.g., at 460) and clean the data. Data cleaning can include identifying and correcting corrupt, inaccurate, or irrelevant records from a dataset, table, or database. Data cleaning can include detecting incomplete, incorrect, or inaccurate parts of data and then replacing, modifying, and/or deleting the affected data.

At 475, storage 410 may perform one or more data processing operations (e.g., executing data processing operations for multiple ETL functions concurrently or in parallel). For example. storage 410 may execute at least one ETL function (e.g., apply at least one ETL transform function) on data stored at storage 410 based on an ETL command that storage 410 receives from client 405. In some cases, storage 410 may execute a sequence of combined ETL functions (e.g., ETL functions combined in a DAG).

At 480, storage 410 may store a result of the zETL data processing operations at 475. In some cases, storage 410 may store a result to a storage drive of storage 410 (e.g., in a data warehouse of storage 410). In some cases, storage 410 may provide the result to client 405 and/or load a result to an application of client 405. In some cases, storage 410 may provide the result to another database (e.g., to a database physically separate from storage 410). In some cases, storage 410 may provide the result to a function (e.g., another function executing on or to be executed on storage 410 or on another storage device). In some cases, storage 410 may store a result in an SQL table (e.g., a database object that stores data in a relational database in a row-and-column format). For instance, storage 410 may store a result in Apache Iceberg (APACHE ICEBERG®). Apache Iceberg may include a table format for big data that has an asynchronous metadata write process.

At 485, client 405 may perform one or more queries. For example, client 405 may query storage 410 (e.g., a data warehouse of storage 410). In some cases, a query of client 405 may include a query on a result of the zETL data processing operations at 475.

At 490, client 405 may plot one or more graphs. For example, client 405 may plot one or more graphs based on a query at 485. In some cases, client 405 may generate one or more plots or graphs that visually represent one or more aspects of a result of the zETL data processing operations at 475.

Figure 5:
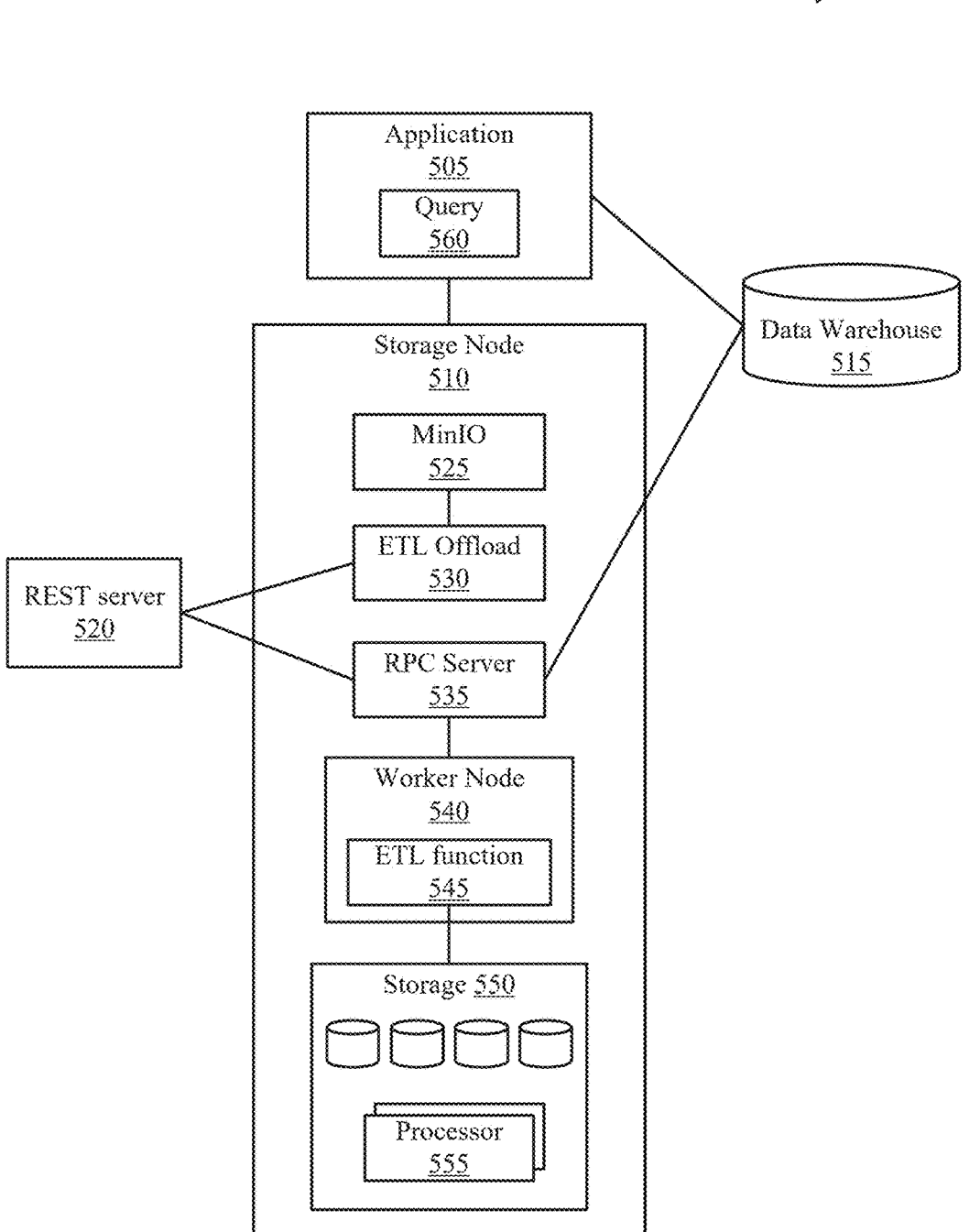
FIG. 5 illustrates an example system in accordance with one or more implementations as described herein.

FIG. 5 illustrates an example system 500 in accordance with one or more implementations as described herein. In some configurations, one or more aspects of system 500 may be implemented by or in conjunction with ETL controller 140 of FIG. 1 and/or ETL controller 230 of FIG. 2. In some configurations, one or more aspects of system 500 may be implemented by or in conjunction with machine 105, components of machine 105, or any combination thereof.

In the illustrated example, system 500 may include application 505, storage node 510 (e.g., node server, storage server), data warehouse 515, and REST server 520. In some cases, application 505 may be associated with a client (e.g., client 405). In some cases, storage node 510 and/or data warehouse 515 may be associated with a storage system (e.g., storage 410). As shown, storage node 510 may include minIO 525, ETL offload 530, Remote Procedure Call (RPC) server 535, worker node 540, and storage 550. As shown, worker node 540 may include one or more ETL functions (e.g., ETL function 545). Storage 550 may include one or more processors (e.g., processor 555).

In some cases, application 505 may initiate offloading ETL processing to storage node 510. For example, application 505 may generate and/or send an ETL command to storage node 510. As shown, minIO 525 may process an ETL command and forward the ETL command to ETL offload 530. As shown, ETL offload 530 handles the ETL command via REST server 520. In some examples, ETL offload 530 may communicate an ETL command to RPC server 535 via REST server 520. For example, ETL offload 530 may send a REST command to REST server 520, and REST server 520 may communicate the REST command to RPC server 535. In some cases, RPC server 535 may be configured as an SVK RPC server (e.g., a storage cluster server). In some cases, applications (e.g., application 505) can talk to an SVK server via REST (e.g., via REST server 520).

In some examples, RPC server 535 may request data from data warehouse 515 based on the REST command. In some cases, RPC server 535 may communicate the ETL command to worker node 540 based on the REST command. In some cases, RPC server 535 may provide data from data warehouse 515 to worker node 540. Worker node 540 may include one or more ETL functions (e.g., ETL function 545). In some cases, worker node 540 may execute ETL function 545 based on the ETL command. In some cases, worker node 540 may execute the ETL function 545 on the data from data warehouse 515, provided by RPC server 535. In some cases, worker node 540 may include a zETL module and/or a zETL plugin that worker node 540 may implement to execute ETL function 545. In some cases, worker node 540 may obtain results of executing ETL function 545 on the data. In some cases, worker node 540 may save the results to data warehouse 515 (e.g., via RPC server 535). In some cases, storage 550 may store data, metadata, results of ETL processing, etc., including files (e.g., comma separate value (CSV) files). In some cases, one or more of these files may be segmented into chunks (e.g., 1 MB chunks).

As shown, application 505 may generate and/or perform query 560. In some cases, query 560 may be sent to data warehouse 515. Application 505 may query ETL processed data (e.g., results) and make a plot or graph based on the ETL processed data. In some cases, application 505 may call an ETL function inside storage node 510 (e.g., ETL function 545) and ETL function 545 may provide a result to application 505.

System 500 provides a zETL framework for offloading ETL processing to a storage device (e.g., storage node 510). System 500 may be configured as a Cognos zETL system, enabling applications (e.g., application 5050) using any storage solution to efficiently pre-process data (e.g., before storing, pre-processing data from data warehouse 515 to storage 550) and/or post-process data (e.g., after local retrieval on storage node 510). System 500 provides a framework where applications can offload ETL functions into storage servers to avoid large data transfers. The framework of system 500 avoids the data movement from data sources (storage) to transform function processing (compute) by performing the functions within the storage servers (e.g., storage node 510). The framework of system 500 tunes I/O based on the ETL functional requirement and the backend storage. The framework of system 500 provides the capability to replicate ETL functions for parallelism, providing flexibility in managing data distribution.

Based on the systems and methods described herein, data may be pre-formatted to improve data retrieval in a distributed storage system and improve ETL turnaround times (e.g., formatting data from data warehouse 515 and storing the formatted data to storage 550). The ETL algorithms (ETL function 545) that process the data are offloaded to the storage system (e.g., storage node 510), performing ETL processing on the storage nodes where the data is, avoiding or minimizing data movement over a fabric or network, improving system efficiency. In some cases, intermediate results may be stored back into the storage (e.g., storage 550, data warehouse 515) or processed inline, providing flexibility for the solutions. System 500 may provide an SSD Value Kit (SVK) platform (e.g., RPC server 535) that provides a uniform interface to configure, manage and interact with worker node 540, ETL function 545, storage 550, and/or processor 555. In some cases, storage node 510 may implement an SVK cluster architecture (e.g., in storage 550), enabling user applications (e.g., application 505) to interact with an SVK zETL APIs. These APIs may include a set of predefined interfaces for storage, Etl operations, and offloading zETL operations. The offloading scheme of the systems and methods described herein may be realized through these APIs.

Based on the systems and methods described herein, system 500 enables results to be stored into formats for various database types through a data adapter plugin, avoiding extra data copying to load the data to a data warehouse. The ETL functions (e.g., ETL function 545) can be registered with the zero ETL framework of system 500 and user applications can use the registered ETL functions in their pipelines without change to the pipeline code.

Figure 6:
FIG. 6 illustrates an example system in accordance with one or more implementations as described herein.
Figure 6:
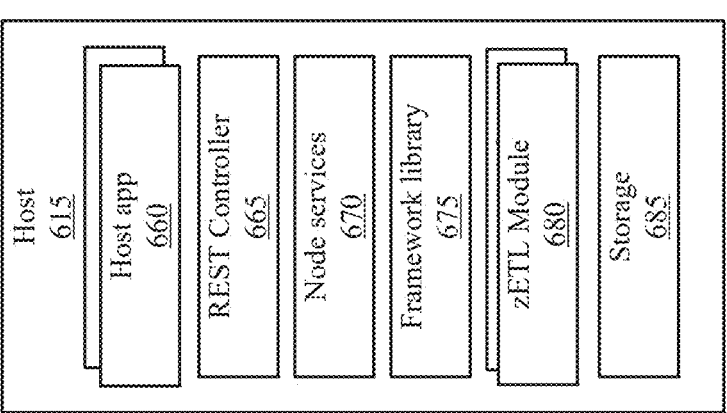

FIG. 6 illustrates an example system 600 in accordance with one or more implementations as described herein. In some configurations, one or more aspects of system 600 may be implemented by or in conjunction with ETL controller 140 of FIG. 1 and/or ETL controller 230 of FIG. 2. In some configurations, one or more aspects of system 600 may be implemented by or in conjunction with machine 105, components of machine 105, or any combination thereof.

In the illustrated example, system 600 may include admin node 605 and one or more hosts (e.g., host 610, host 615). In some cases, management app 620 may include and/or implement a web-based business intelligence (BI) tool (e.g., Cognos). As shown, host 610 may include one or more host applications (e.g., host app 630), REST controller 635 (e.g., Cognos REST/controller services), node services 640 (e.g., Cognos node services), framework library 645 (e.g., Cognos framework library), zETL module 650 (e.g., SVK zETL module), and storage 655. As shown, host 615 may include one or more host applications (e.g., host app 660), REST controller 665 (e.g., Cognos REST/controller services), node services 670 (e.g., Cognos node services), framework library 675 (e.g., Cognos framework library), zETL module 680 (e.g., SVK zETL module), and storage 685. In some cases, storage 655 and/or storage 685 may include one or more CXL Memory Module-DRAM (CMM-D) devices; one or more CXL Memory Module-Hybrid (CMM-H) devices; and/or one or more CXL Memory Module-Box (CMM-B) memory pooling devices.

The systems and methods described may include offloadable modules (e.g., zETL modules) configured to adhere to a specific format defined by SVK zETL and are built by the user. In some examples, zETL module 650 may be configured as offload-able modules. These offload-able modules may be pre-built and offloaded into a storage server (e.g., storage server 325, node server 340, node server 345, storage node 510) using the SVK zETL APIs (e.g., zETL API 330). Capabilities of a given zETL module may be queried at runtime. Once a zETL module is offloaded, the pipeline at runtime can utilize the functions in the zETL module for processing data in the storage server itself rather than transferring it to the application server, hence saving on valuable bandwidth and reducing network latencies. Also, as ETL functions can be applied independently per object, several objects can be processed in parallel, and with almost even distribution of objects the optimal throughput can be achieved.

In some cases, offload-able modules (e.g., zETL module 650, zETL module 680) can be added, modified, removed when desired, giving the SVK zETL systems and methods described herein the flexibility to scale up seamlessly. For example, the infrastructure for building the offload-able modules can be extended to support several different languages and or have a common framework for writing offload modules or support converting them to the way the zETL can utilize the modules.

In some examples, system 600 provides a framework that offloads ETL functions into storage servers/devices at a cluster level. System 600 avoids data transfers in the storage systems by performing functions of the pipeline in storage server and/or storage devices (e.g., storage 655, storage 685). System 600 provides a framework that enables ETL functions to be offloaded and executed in parallel, to achieve high throughput and reduce latency. System 600 enables ETL processing across different storage servers through storage adapters (e.g., custom data preprocessing), avoiding extra hops. System 600 provides a framework that enables dynamic (re) distribution of ETL functions as part of cluster rebalancing. For example, based on the systems and methods described herein, ETL functions may be executed by one or more zETL modules (e.g., zETL module 650, zETL module 680, etc.). In some cases, one or more functions may be distributed to zETL module 650 (e.g., via admin node

605). In some examples, one or more ETL functions may be swapped between zETL modules. Additionally, or alternatively, one or more functions may be distributed to zETL module 680 (e.g., via admin node 605).

In some examples, at least one ETL function may be redistributed or moved from zETL module 650 to zETL module 680. Additionally, or alternatively, one or more ETL functions may be redistributed or moved from zETL module 680 to zETL module 650. In some cases, admin node 605 may identify an imbalance in the distribution of ETL functions. For example, admin node 605 may determine a zETL module is assigned a relatively high number of ETL functions. In some cases, admin node 605 may determine that a latency or processing time of a zETL module exceeds a threshold (e.g., based on average processing time, based on expected processing time, etc.). Accordingly, admin node 605 may distribute and/or redistribute one or more ETL functions among a pool of zETL modules (e.g., zETL module 650, zETL module 680, etc.). In some cases, one or more ETL commands may be distributed and/or redistributed based on processing loads across zETL modules. For example, admin node 605 may determine that a processing load of a zETL module exceeds a processing load threshold (e.g., based on an average processing load or real-time average processing load among zETL modules). Based on the distribution and/or redistribution of ETL functions and/or ETL commands, ETL operations may be balanced across zETL modules of a storage cluster.

Figure 7:
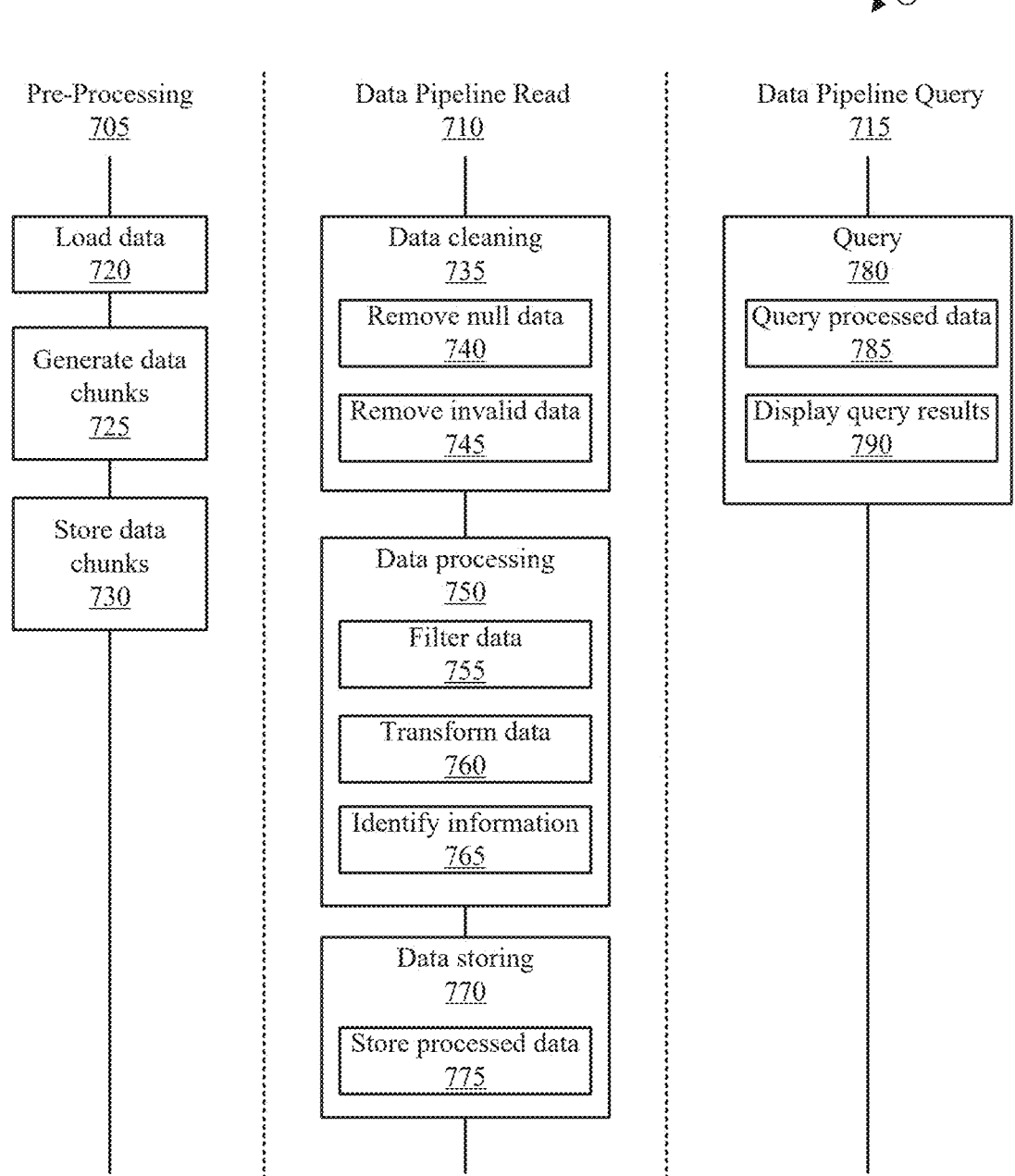
FIG. 7 illustrates an example system flow in accordance with one or more implementations as described herein.

FIG. 7 illustrates an example system flow 700 in accordance with one or more implementations as described herein. In some configurations, one or more aspects of system flow 700 may be implemented by or in conjunction with ETL controller 140 of FIG. 1 and/or ETL controller 230 of FIG. 2. In some configurations, one or more aspects of system flow 700 may be implemented by or in conjunction with machine 105, components of machine 105, or any combination thereof.

In some examples, system flow 700 may depicts one or more operations associated with offloading ETL processing to storage devices. In the illustrated example, system flow 700 may include pre-processing 705, data pipeline read 710, and data pipeline query 715. In some cases, pre-processing 705 may be asynchronous from a data pipeline. In some cases, pre-processing 705 may be performed prior to running a data pipeline application.

At 720, pre-processing 705 may include loading data. For example, pre-processing 705 may include loading data from a data warehouse (e.g., data warehouse 515) to a local storage (e.g., storage 550). At 725, pre-processing 705 may include generating data chunks (e.g., 1 MB data chunks, CSV data chunks). In some cases, the data chunks may be based on granularity and/or schema boundary considerations. At 730, pre-processing 705 may include storing the data chunks (e.g., in a storage node, storage 360, storage 410, storage 550, storage 655).

In some examples, data pipeline read 710 may include a data pipeline application read that triggers the offloaded ETL systems and methods described herein. At 735, data pipeline read 710 may include data cleaning 735 (e.g. cleaning data loaded from 720, cleaning stored data chunks from 730). At 740, data cleaning may include removing null data. At 745, cleaning data may include removing invalid data. At 750, data pipeline read 710 may include data processing (e.g., ETL processing, executing ETL functions on the data). At 755, data processing may include filtering data (e.g., filtering based data criteria, based on data size, based on file type, etc.). For example, filtering data may include filtering hourly data based on rainfall and temperature range. At 760, data processing may include transforming the data (e.g., converting temperature data from Celsius to Fahrenheit). At 765, data processing may include identifying information (e.g., calculate weather pleasantness rating scores, add a column for the rating scores, added to a column of a CSV file).

At 770, data pipeline read 710 may include storing the data. At 775, data storing may include storing the processed data (e.g., results of the ETL data processing) to a local storage device and/or to a data warehouse. For example, the processed data may be saved in storage for subsequent queries on the processed data and information derived from the processed data.

In some examples, data pipeline query 715 may include a data pipeline application querying a data warehouse to get processed data. At 780, data pipeline query 715 may include performing a query. At 785, the query may include querying processed data (e.g., querying ETL processed data). For example, an application (e.g., top-level application) may query a data warehouse, where the query retrieves at least a portion of the processed data. At 790, the query may include displaying query results. For example, a result of the query may be displayed. In some cases, displaying query results may include generating one or more graphs or plots that provide a visual depiction of the information gained from ETL processed data. For example, a graph may be generated based on the query result. For instance, times (e.g., days, hours) based on pleasantness rating scores may be displayed in a determined order (e.g., ranked in order from highest rating to lowest rating).

Based on the systems and methods described herein, including the systems and methods of system flow 700, data may be stored as chunks for better distribution and increased ETL processing parallelism. Based on the systems and methods, ETL functions (including query evaluations) may be offloaded and processed in parallel. Based on the systems and methods, ETL processing results may be stored in a database (e.g., local storage, data warehouse). In some cases, the data (e.g., pre-processed fetched data, ETL processed data) may be formatted according to a specified format (e.g., specified by a zETL adapter).

Figure 8:
FIG. 8 illustrates an example system in accordance with one or more implementations as described herein.
Figure 8:
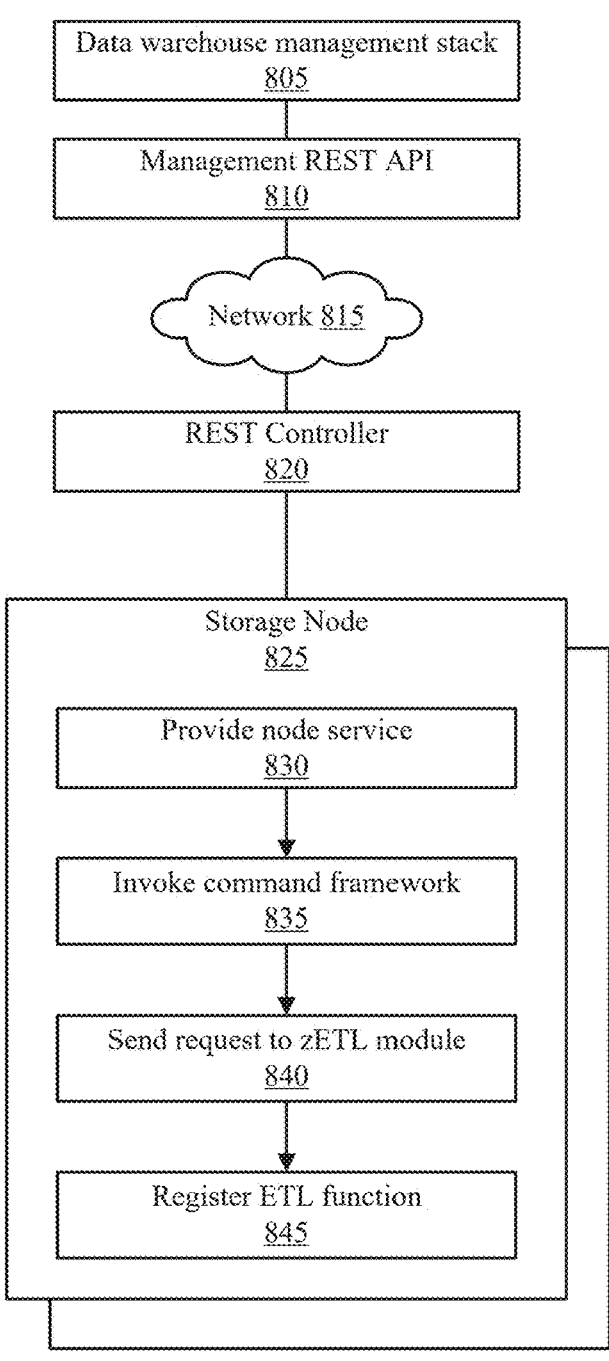

FIG. 8 illustrates an example system 800 in accordance with one or more implementations as described herein. In some configurations, one or more aspects of system 800 may be implemented by or in conjunction with ETL controller 140 of FIG. 1 and/or ETL controller 230 of FIG. 2. In some configurations, one or more aspects of system 800 may be implemented by or in conjunction with machine 105, components of machine 105, or any combination thereof.

In the illustrated example, system 800 may include data warehouse management stack 805, management REST API 810, network 815, REST controller 820, and one or more storage nodes (e.g., storage node 825, one or more Cognos node servers, etc.).

In the illustrated example, data-warehouse management stack 805 may invoke a management REST API (e.g., Cognos management REST API) to download and register the ETL binary with a zETL framework (e.g., register ETL transform module for processing of data warehouse data). Registering may include registering a feature name for the ETL function (e.g., feature_name="zETL") and/or registering a transform module (TM) name (e.g., TM_name="filter_logic_1").

In some examples, a request (e.g., ETL request) may be handled by REST controller 820 (e.g., Cognos REST/Controller service).

In some examples, the request may be validated (e.g., by REST controller 820) and routed to at least one host (e.g., to storage node 825, to a second storage node, etc.; to all hosts where a Cognos node server is running).

At 830, storage node 825 may be configured to provide a node service. In some examples, storage node 825 may be configured to parse the request and identify the zETL module the request is destined for and route the request to the corresponding zETL module (e.g., via Cognos command framework). At 835, storage node 825 may be configured to invoke a command framework.

At 840 storage node 825 may be configured to send a request (e.g., an ETL request) to a zETL module (e.g., zETL module 650). In some cases, upon receiving the request, the zETL module may further parse the request to obtain a subtask. In this case, the subtask may include downloading and registering an application specific ETL function.

At 845 storage node 825 may be configured to register one or more ETL functions (e.g., register one or more ETL transform module binaries). In some cases, functions may be registered with multiple nodes (e.g., with storage node 825, a second storage node, etc.). For example, a first function may be registered with a first node, a second function may be registered with a second node, and so on. Additionally, or alternatively, a first function may be registered with a first node and a second node, a second function may be registered with a first node and a second node, and so on. In some cases, storage node 825 may load one or more ETL functions (e.g., to a location indicated in a request, a location supplied in a request).

In some cases, ETL functions may be defined and registered into a zETL framework, either as a pipeline and/or as individual functions. ETL functions may be run in parallel or concurrently for corresponding applications. In some cases, zETL APIs may manage data reads/writes between the local storage and ETL functions. In some cases, zETL APIs may manage data reads/writes between the ETL functions and the user application.

In some examples, an application developers may write a transform module (e.g., ETL function) by implementing APIs of a Cognos zETL framework. An application developer may identify desired functions (e.g., decrypt, decompress, parse the buffer, etc.) and apply transform functionalities the user wants to implement. In some cases, the application developer may return the resulted buffer to the zETL framework (e.g., optionally in a compressed/encrypted format). The application developer may create a loadable binary format like shared library format (e.g., for Linux). Multiple transform modules may be written for multiple ETL transform functions for pipelining (e.g., filter and then count, filter and join two KVs etc.). Based on Cognos management API, the application specific ETL transform module may be uploaded/registered to the zETL framework. During an execution path, the zETL framework may use a storage solution specific DB connector module (e.g., dss_db_connector module) to extract data from storage, pass the buffer to a corresponding transform module, and then either load the result to another bucket, save the result to a database, and/or load the result in a user application.

Figure 9:
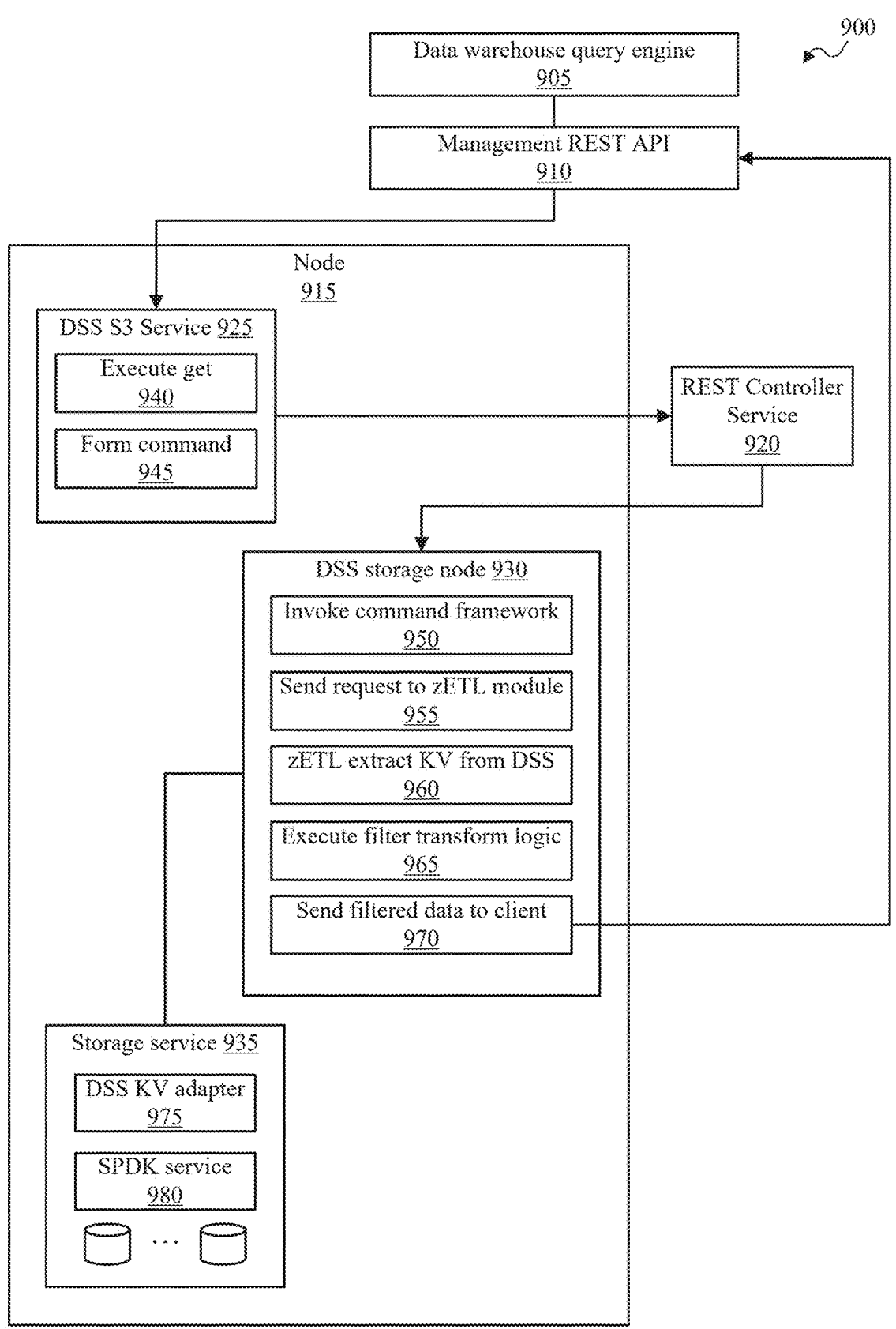
FIG. 9 illustrates an example system in accordance with one or more implementations as described herein.

FIG. 9 illustrates an example system 900 in accordance with one or more implementations as described herein. In some configurations, one or more aspects of system 900 may be implemented by or in conjunction with ETL controller 140 of FIG. 1 and/or ETL controller 230 of FIG. 2. In some configurations, one or more aspects of system 900 may be implemented by or in conjunction with machine 105, components of machine 105, or any combination thereof.

In the illustrated example, system 900 may include data warehouse query engine 905, management REST API 910, node 915 (e.g., storage node, server node, DSS storage node), REST controller service 920. As shown, node 915 may include DSS S3 service 925, DSS storage node 930, and storage service 935. As shown, storage service 935 may include one or more storage drives (e.g., one or more SSDs, storage clusters, etc.).

In the illustrated example, data warehouse query engine 905 (e.g., SNOWFLAKE® query engine, cloud-based data warehousing and analytics platform) may perform data retrieval (e.g., fetch one or more key value (KV) pairs (in a batch)). In some cases, data warehouse query engine 905 may specify filtering (transform), logic name (e.g., registered with Cognos), and/or other aspects data warehouse query engine 905 selects for the data retrieval.

In some examples, management REST API 910 may communicate a get request to node 915. In some cases, an S3 client wrapper library from a DSS stack may convert a get request from management REST API 910 (e.g., a non-standard ETL get request) to an S3 get request based on a specialized key. Examples of the specialized key may include S3::Get {key="cognos::zETL::<key_name>", val=<rdd_info>+<max_size_allocated>, subcmd=filter_x}, where rdd may stand for RDMA Data Direct. When a DSS stack (e.g., of node 915) identifies an RDMA capable network interface card (NIC) on the client side, the DSS stack may transfer the result data directly to the client with zero overhead.

After DSS S3 service 925 receives the request, DSS S3 service 925 may parse the request and determine the request includes a zETL command. DSS S3 service 925 may create a Cognos zETL REST command that a Cognos framework understands. In some cases, the zETL REST command may include a host server name where the requested KV pair is stored. If the command is part of a batch operation, commands associated with the same storage node (e.g., associated with requests for KV pairs on the same storage node) may be batched into one command (e.g., one batch of commands). At 940, DSS S3 service 925 may execute a get (e.g., S3 get request). At 945, DSS S3 service 925 may form one or more ETL commands based on the get request.

In some examples, DSS SE service 925 may send a REST command (e.g., Cognos zETL REST command) to REST controller service 920 (e.g., Cognos REST/Controller service), which may be running on the same node (e.g., node 915) or on a different node. In some cases, REST controller service 920 may include a REST service and/or a Controller service (e.g., Cognos REST and Controller service). In some cases, REST controller service 920 may receive host server information (e.g., receive only the host server information for a given get request or ETL command). REST controller service 920 may pass the request to DSS storage node 930 (e.g., Cognos node service running on the specified node, on the specified host server).

In some examples, after parsing the request, DSS storage node 930 may determine the zETL module the request is destined for and route the request to the specified zETL module (e.g., via Cognos command framework). For example, at 950, DSS storage node 930 may invoke a command framework. At 955, DSS storage node 930 may send the request to the zETL module.

In some examples, DSS storage node 930 may determine the request is for an ETL function (e.g., ETL function request). In some cases, DSS storage node 930 may issue one or more local KV reads based on identifying the ETL function request. In some cases, DSS storage node 930 may issue the local KV reads in conjunction with a DSS DB connector module to the DSS storage service where the KV is indicated to be stored. For example, at 960, DSS storage node 930 may extract KV pairs from DSS storage (e.g., storage service 935). As shown, storage service 935 may include DSS KV adapter 975 and Storage Performance Development Kit (SPDK) service 980. In some cases, SPDK service 980 may provide a set of tools and libraries for writing high performance, scalable, user-mode ETL storage applications.

In some examples, after getting the value buffer (e.g., value buffer of KV pair; via RDD zero copy), DSS storage node 930 may pass the value buffer (e.g., from storage service 935) to the requested zETL module for processing. For example, at 965, DSS storage node 930 may execute filter transform logic (e.g., execute one or more ETL functions on DSS storage node 930). Processing at the zETL module may be pipelined for multi-level processing with multiple ETL transform modules.

In some examples, after processing, DSS storage node 930 may transfer the result buffer to a client (e.g., via RDD zero copy), store the result buffer back to DSS storage (e.g., storage service 935, DSS storage node 930), load the result buffer to a client application or to a different database. At 970, DSS storage node 930 may send the filtered data (e.g., result buffer, ETH processing result) to a client (e.g., via management REST API 910).

Figure 10:
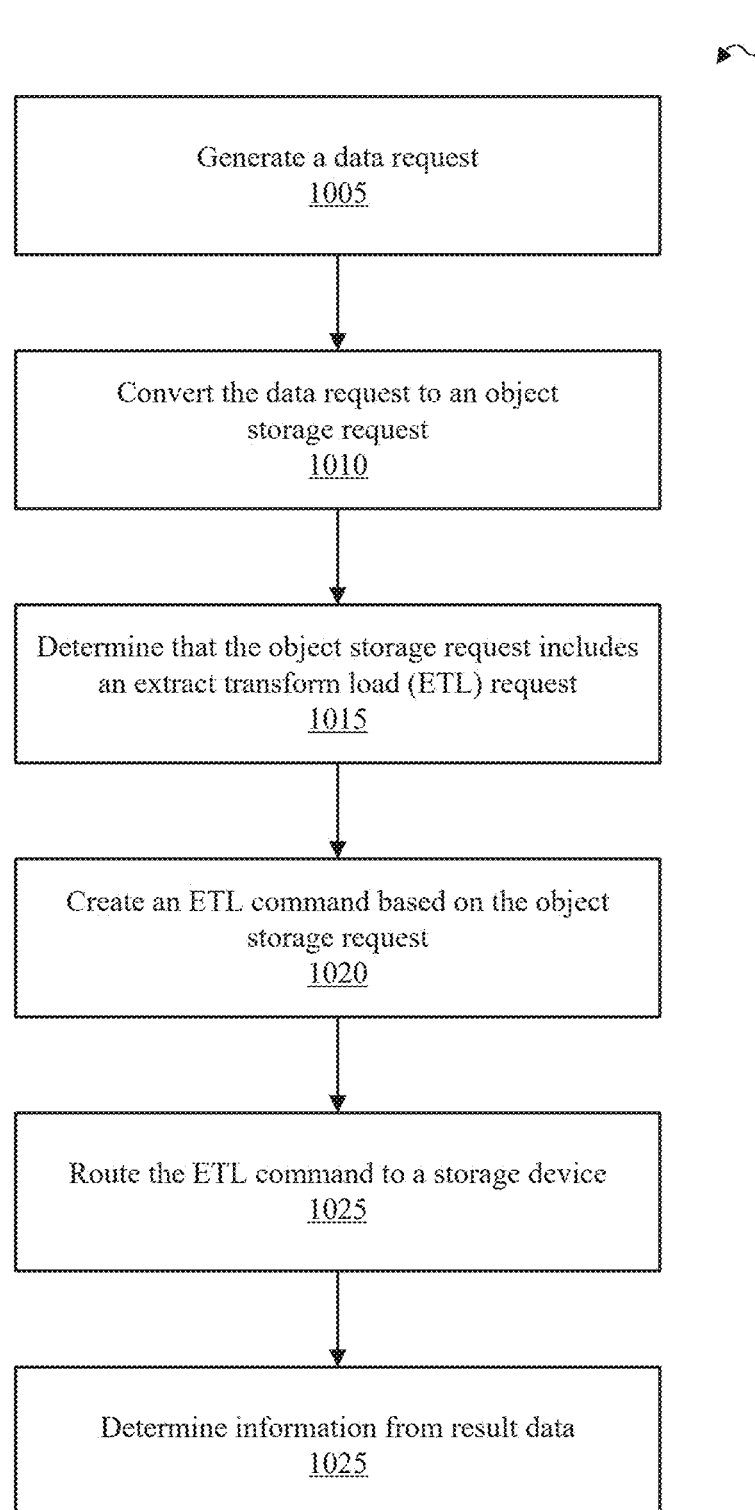
FIG. 10 depicts a flow diagram illustrating an example method associated with the disclosed systems, in accordance with example implementations described herein.

FIG. 10 depicts a flow diagram illustrating an example method 1000 associated with the disclosed systems, in accordance with example implementations described herein. In some configurations, one or more aspects of method 1000 may be implemented by or in conjunction with ETL controller 140 of FIG. 1 and/or ETL controller 230 of FIG. 2. In some configurations, one or more aspects of method 1000 may be implemented by or in conjunction with machine 105, components of machine 105, or any combination thereof. The depicted method 1000 is just one implementation and one or more operations of method 1000 may be rearranged, reordered, omitted, and/or otherwise modified such that other implementations are possible and contemplated.

At 1005, method 1000 may include generating a data request. For example, a client or an application of a client may generate a data request for at least a subset of data stored in a database.

At 1010, method 1000 may include converting the data request to an object storage request. For example, the client may convert the data request to an object storage request.

At 1015, method 1000 may include determining that the object storage request includes an extract transform load (ETL) request. For example, the client or client application may determine, based on parsing the object storage request, that the object storage request includes an extract transform load (ETL) request.

At 1020, method 1000 may include creating an ETL command based on the object storage request. For example, the client or client application may create an ETL command based on the object storage request.

At 1025, method 1000 may include routing the ETL command to a storage device. For example, the client or client application may route the ETL command to a storage device (e.g., storage server, computational storage drive) based on the storage device comprising at least one ETL function requested in the data request.

At 1030, method 1000 may include determining information from result data. For example, the client or client application may determine information from result data that is received from the storage device in response to routing the ETL command to the storage device.

Figure 11:
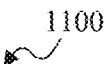
FIG. 11 depicts a flow diagram illustrating an example method associated with the disclosed systems, in accordance with example implementations described herein.
Figure 11:
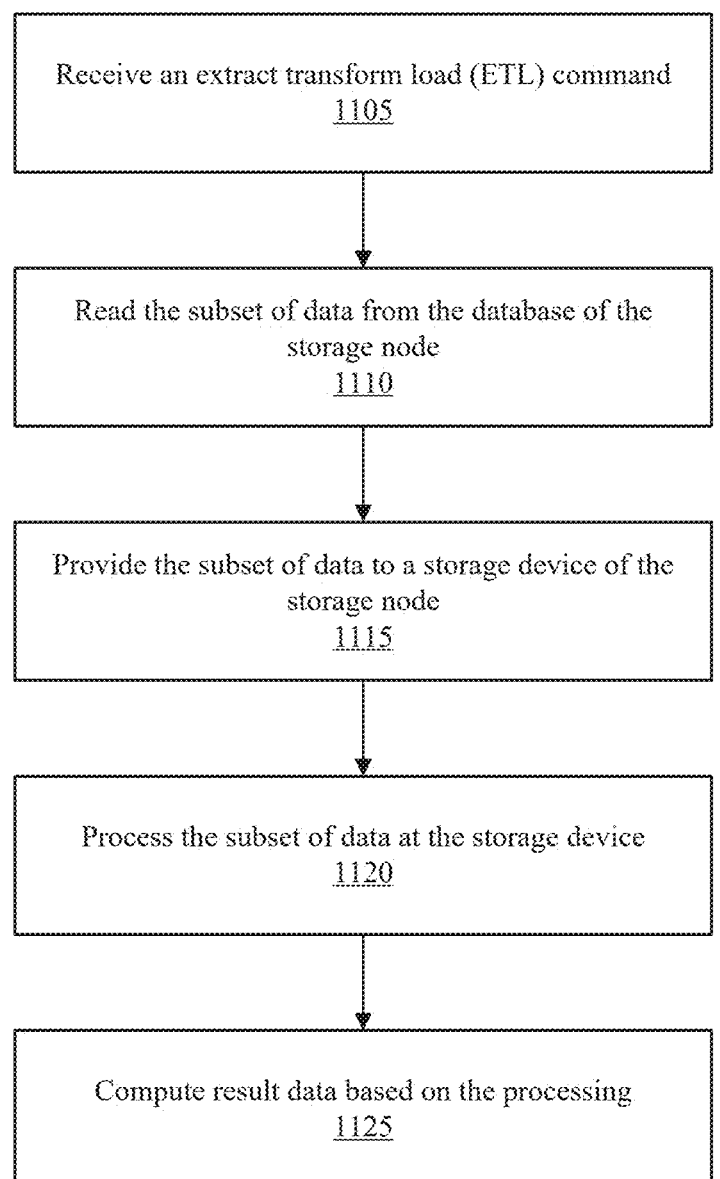

FIG. 11 depicts a flow diagram illustrating an example method 1100 associated with the disclosed systems, in accordance with example implementations described herein. In some configurations, one or more aspects of method 1100 may be implemented by or in conjunction with ETL controller 140 of FIG. 1 and/or ETL controller 230 of FIG. 2. In some configurations, one or more aspects of method 1100 may be implemented by or in conjunction with machine 105, components of machine 105, or any combination thereof. The depicted method 1100 is just one implementation and one or more operations of method 1100 may be rearranged, reordered, omitted, and/or otherwise modified such that other implementations are possible and contemplated.

At 1105, method 1100 may include receiving an extract transform load (ETL) command. For example, a storage node (e.g., node server, storage server, computational storage drive, storage cluster) may receive an extract transform load (ETL) command at a storage node, the ETL command comprising a data request for a subset of data stored in a database.

At 1110, method 1100 may include reading the subset of data from the database of the storage node. For example, the storage node may read the subset of data from the database of the storage node.

At 1115, method 1100 may include providing the subset of data to a storage device of the storage node. For example, the storage node may provide the subset of data to a storage device of the storage node for processing of the subset of data at the storage device.

At 1120, method 1100 may include processing the subset of data at the storage device. For example, the storage node may process the subset of data at the storage device based on the storage device comprising at least one ETL function requested in the data request.

At 1125, method 1100 may include computing result data based on the processing. For example, the storage node may compute result data based on the processing.

Figure 12:
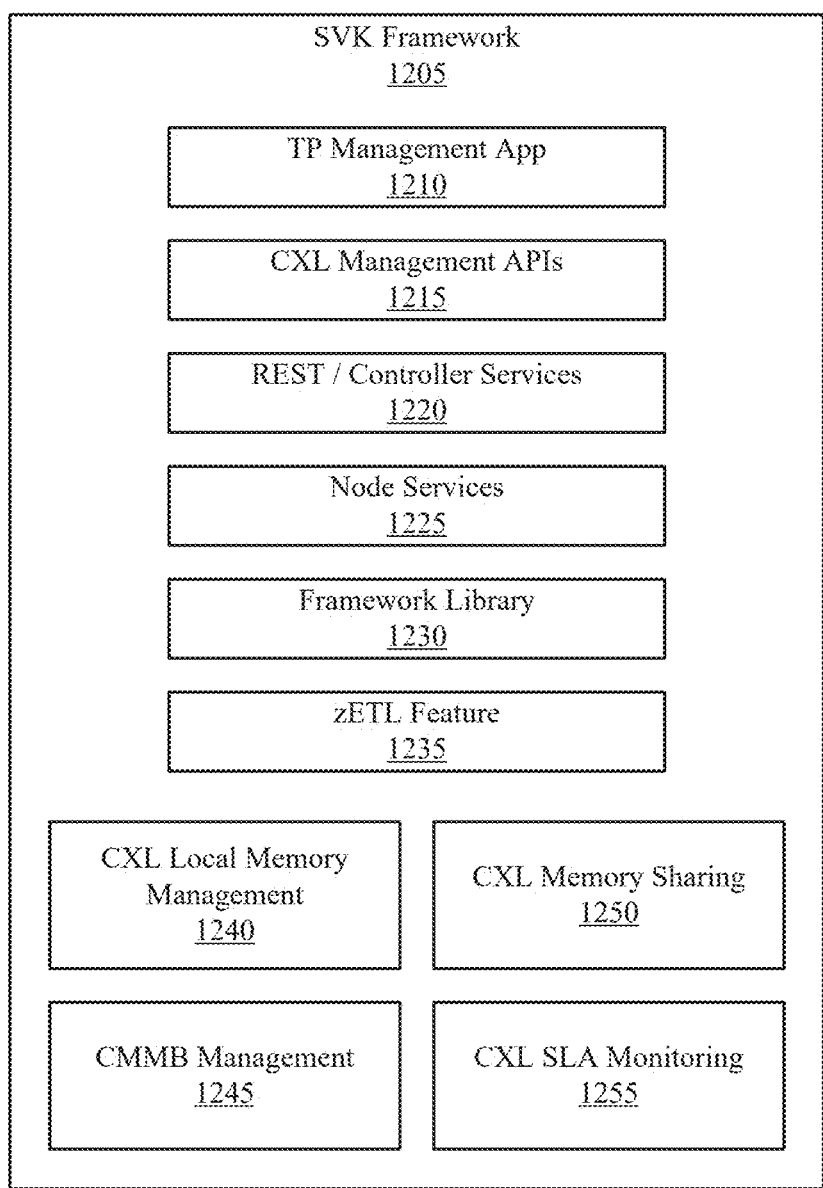
FIG. 12 illustrates an example system in accordance with one or more implementations as described herein.

FIG. 12 illustrates an example system 1200 in accordance with one or more implementations as described herein. In some configurations, one or more aspects of system 1200 may be implemented by or in conjunction with ETL controller 140 of FIG. 1 and/or ETL controller 230 of FIG. 2. In some configurations, one or more aspects of system 1200 may be implemented by or in conjunction with machine 105, components of machine 105, or any combination thereof.

In the illustrated example, system 1200 may include an SSD value kit (SVK) framework 1205. In some cases, system 1200 may enable one or more aspects of the systems and methods of data analytics based on zero extract transform load (ETL) described herein. As shown, SVK framework 1205 may include management app 1210, CXL management APIs 1215, REST/Controller services 1220, node services 1225, framework library 1230, zETL feature 1235, CXL local memory management 1240, CXL Memory Module Box (CMMB) management 1245, CXL memory sharing 1250, and CXL Service Level Agreement (SLA) monitoring 1255.

In some examples, management app 1210 may provide a user interface and/or a command line interface for zETL operations described herein. For example, management app 1210 may enable a user or application to define a storage cluster for zETL operations, add devices (e.g., storage nodes) to a zETL system, reconfigure devices, etc. In some cases, CXL management APIs 1215 may manage APIs associated with zETL operations described herein. In some cases, CXL management APIs 1215 may provide and/or manage one or more REST APIs for zETL operations described herein. REST/Controller services 1220 may provide REST services (e.g., associated with REST APIs). In some cases, REST/Controller services 1220 may control one or more aspects of REST services associated with zETL operations described herein (e.g., enable REST API, modify REST API, disable REST API, manage data and/or data movement based on REST APIs, etc.). In some examples, node services 1225 may manage one or more nodes associated with zETL operations described herein (e.g., configure, add, remove, and/or update storage nodes).

In some cases, framework library 1230 may be configured to communicate with zETL feature modules (e.g., zETL feature 1235). In some cases, zETL feature 1235 may be an example of ETL controller 140, ETL controller 230, zETL plugin 350, zETL plugin 365, worker node 540, zETL module 650, zETL 680, and/or data processing 750. In some cases, framework library 1230 may provide a library of features and configurations associated with zETL operations described herein.

In some examples, zETL feature 1235 may be configured to execute one or more zETL functions via one or more processing units of a storage node (e.g., storage server, computational storage drive, etc.). In some examples, CXL local memory management 1240 may manage one or more aspects of memory (e.g., CXL local memory) of a given storage node, including memory operations (e.g., read, write, allocate, deallocate, etc.). CMMB management 1245 may be configured to provide memory pooling services based on CXL protocols. CXL memory sharing 1250 may be configured to share memory between one or more entities (e.g., storage nodes, hosts, applications, etc.). CXL SLA monitoring 1255 may be configured to govern how users, devices, and/or applications are allowed to use zETL operations provided by zETL feature 1235.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term "communicate" is intended to include transmitting, or receiving, or both transmitting and receiving. Similarly, the bidirectional exchange of data between two devices (both devices transmit and receive during the exchange) may be described as 'communicating', when only the functionality of one of those devices is being claimed. The term "communicating" as used herein with respect to wired and/or wireless communication signals includes transmitting the wired and/or wireless communication signals and/or receiving the wired and/or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time- Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of data analysis comprising:
generating a data request for at least a subset of data stored in a database;
converting the data request to an object storage request;
determining, based on parsing the object storage request, that the object storage request includes an extract transform load (ETL) request;
creating an ETL command based on the object storage request;
routing the ETL command to a storage device based on the storage device comprising at least one ETL function requested in the data request; and
determining information from result data that is received from the storage device in response to routing the ETL command to the storage device.

2. The method of claim 1, wherein the result data is generated based on the subset of data being transformed at the storage device according to the ETL function.

3. The method of claim 1, wherein the ETL command is configured as a representational state transfer (REST) command based on determining the object storage request includes the ETL request.

4. The method of claim 3, wherein the ETL command includes a name of a storage node comprising the storage device.

5. The method of claim 1, further comprising:
determining the data request is part of a batch data request; and
combining the data request with at least a second request based on the data request and the second request being associated with a same host server.

6. The method of claim 1, further comprising:
determining a second storage device is associated with a processing load imbalance; and
distributing at least one of an ETL function of the second storage device or a second ETL command assigned to the second storage device from the second storage device to the storage device based on the processing load imbalance.

7. The method of claim 1, wherein the storage device comprises at least one of a storage server or a computational storage drive comprising one or more processors configured to execute the transform function.

8. The method of claim 1, wherein the data request comprises at least one of:
a key value (KV) fetch and the database comprises a KV database, or
a filter criterion for narrowing down data in the database to the subset of data.

9. The method of claim 1, wherein the data request specifies an identifier for the data request.

10. The method of claim 1, wherein the object storage request includes an ETL identifier.

11. A method of data analysis comprising:

receiving an extract transform load (ETL) command at a storage node, the ETL command comprising a data request for a subset of data stored in a database;

reading the subset of data from the database of the storage node;

providing the subset of data to a storage device of the storage node for processing of the subset of data at the storage device;

processing the subset of data at the storage device based on the storage device comprising at least one ETL function requested in the data request; and computing result data based on the processing.

12. The method of claim 11, further comprising providing the result data to at least one of a client device that provided a representational state transfer (REST) command associated with the ETL command, to an application of the client device, to the storage device to store the result data, to a different storage device, or to a function requesting the result data.

13. The method of claim 11, further comprising transferring the result data to a client device that provided the ETL command based on the ETL command including remote direct memory access (RDMA) data direct information that indicates the client device includes an RDMA capable network interface card.

14. The method of claim 11, further comprising identifying a second data request based on the ETL command being configured as a batch command, the ETL command comprising the second data request for a second subset of data stored in the database.

15. The method of claim 14, further comprising processing the second subset of data at a second storage device based on the second storage device comprising at least a second ETL function requested in the second data request.

16. The method of claim 11, wherein the storage device comprises at least one of a storage server or a computational storage drive comprising one or more processors for processing the subset of data at the storage device.

17. The method of claim 11, wherein the data request comprises a key value (KV) fetch and the database comprises a KV database.

18. A non-transitory computer-readable medium storing code that comprises instructions executable by a processor to:

generate a data request for at least a subset of data stored in a database;

convert the data request to an object storage request;

determine, based on parsing the object storage request, that the object storage request includes an extract transform load (ETL) request;

create an ETL command based on the object storage request;

route the ETL command to a storage device based on the storage device comprising at least one ETL function requested in the data request; and determine information from result data that is received from the storage device in response to routing the ETL command to the storage device.

19. The non-transitory computer-readable medium of claim 18, wherein the result data is generated based on the subset of data being transformed at the storage device according to the ETL function.

20. The non-transitory computer-readable medium of claim 18, wherein the ETL command is configured as a representational state transfer (REST) command based on determining the object storage request includes the ETL request.

* * * * *